(12) United States Patent
Masuda et al.

(10) Patent No.: US 7,835,064 B2
(45) Date of Patent: Nov. 16, 2010

(54) METHOD OF MANUFACTURING INFORMATION DISPLAY PANEL

(75) Inventors: Yoshitomo Masuda, Hamura (JP); Taichi Kobayashi, Kodaira (JP); Hirotaka Yamazaki, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 470 days.

(21) Appl. No.: 11/919,211

(22) PCT Filed: Apr. 25, 2006

(86) PCT No.: PCT/JP2006/308659
§ 371 (c)(1), (2), (4) Date: Oct. 25, 2007

(87) PCT Pub. No.: WO2006/118116
PCT Pub. Date: Nov. 9, 2006

(65) Prior Publication Data
US 2009/0273826 A1    Nov. 5, 2009

(30) Foreign Application Priority Data

| Apr. 26, 2005 | (JP) | ............................. 2005-127923 |
| Apr. 28, 2005 | (JP) | ............................. 2005-130652 |
| Apr. 28, 2005 | (JP) | ............................. 2005-131876 |
| May 2, 2005 | (JP) | ............................. 2005-133928 |
| May 2, 2005 | (JP) | ............................. 2005-133941 |
| Apr. 24, 2006 | (JP) | ............................. 2006-119327 |

(51) Int. Cl.
*G02B 26/00* (2006.01)

(52) U.S. Cl. ..................... 359/296; 359/290; 359/295

(58) Field of Classification Search .................. 359/290, 359/291, 292, 295, 296, 298
See application file for complete search history.

(56) References Cited

U.S. PATENT DOCUMENTS

| 6,741,387 B2 * | 5/2004 | Shigehiro et al. ........... 359/296 |
| 2004/0216836 A1 | 11/2004 | Ukigaya |

FOREIGN PATENT DOCUMENTS

| JP | 2003-241231 A | 8/2003 |
| JP | 2004-94137 A | 3/2004 |
| JP | 2004-199003 A | 7/2004 |
| JP | 2004-233575 A | 8/2004 |
| WO | WO 03/027763 A1 | 4/2003 |

* cited by examiner

*Primary Examiner*—Scott J Sugarman
*Assistant Examiner*—Brandi N Thomas
(74) *Attorney, Agent, or Firm*—Sughrue Mion, PLLC

(57) ABSTRACT

In a method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, a display media filling process for filling the display media in the cell includes: a display media charging and supporting process for supporting charged display media; a display media aligning process for aligning the supported display media corresponding to an electrostatic latent image; and a display media transferring and filling process for transferring and filling the aligned display media in the cell.

19 Claims, 24 Drawing Sheets

FIG. 7
(a)
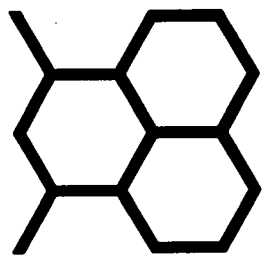
cell opening shape : hexagon, honeycomb arrangement
(b)
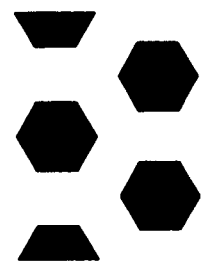
corresponding electrostatic latent image pattern
FIG. 8
(a)
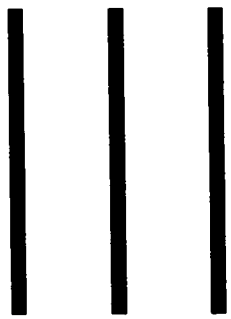
cell opening shape : line arrangement
(b)
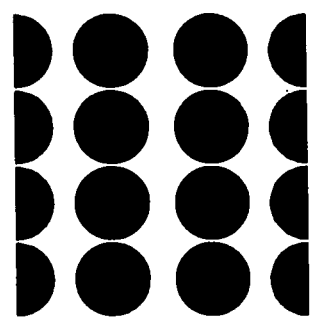
corresponding electrostatic latent image pattern

FIG. 9
(a)
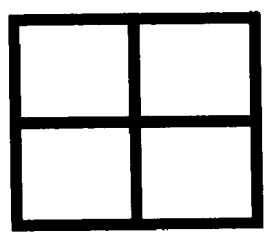
cell opening shape : quadrangle,
grid arrangement
(b)
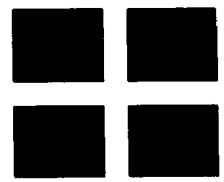
corresponding electrostatic
latent image pattern
FIG. 10
(a)
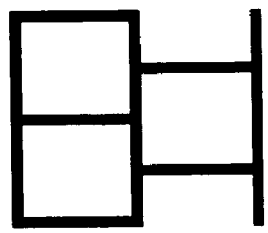
cell opening shape : quadrangle,
honeycomb arrangement
(b)
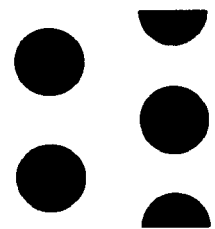
corresponding electrostatic
latent image pattern FIG. 26
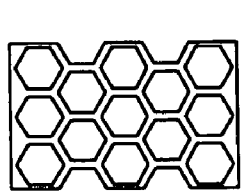
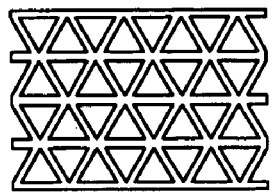
hexagonal
triangle
square
quadrangle
} honecomb arrangement
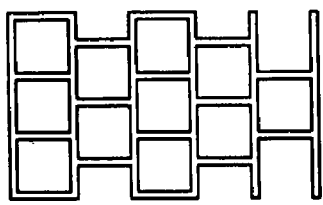
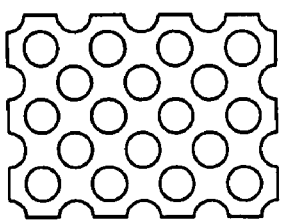
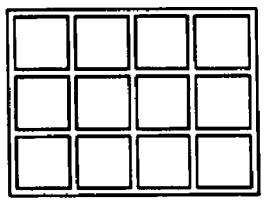
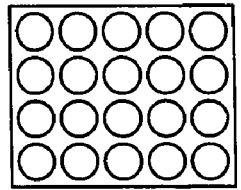
square
quadrangle
} grid arrangement
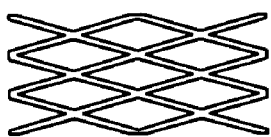
quadrangle } mesh arrangement

METHOD OF MANUFACTURING INFORMATION DISPLAY PANEL

TECHNICAL FIELD

The present invention relates to a method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image.

RELATED ART

As an information display device substitutable for liquid crystal display (LCD), information display devices with the use of technology such as an electrophoresis method, an electro-chromic method, a thermal method, a dichroic-particles-rotary method and so on are proposed.

As for these information display devices, it is conceivable as inexpensive visual display device of the next generation from a merit having wide field of vision close to normal printed matter, having smaller consumption, or having a memory function, as compared with LCD, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, there are some problems on this method: such that a construction becomes complicated since it is necessary to provide the charge transport layer, further a charge generation layer; and such that a display stability is deteriorated since it is difficult to constantly inject a charge in a conductive particle.

As one method for solving various problems mentioned above, there is known an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image.

In a method of manufacturing the information display panel, as a method of filling the display media (i.e. particles for display media constituting the display media) between the substrates, use may be made of an applying method in which the display media are applied on a panel substrate and a dispersing method in which the particles for display media are dispersed on the substrate by suspending the display media in an air by means of an agitation or an air-blow and passing the panel substrate therethrough. Among these methods mentioned above, in the applying method, there is a drawback such that an insufficiency and an unevenness of filling amount (applying amount) occur easily, since the display media hardly adhere to the panel substrate. Moreover, in the dispersing method, the display media are mounted on top portions of the partition walls, if a plurality of cells are formed in a space between the substrates by the partition walls arranged for maintaining a distance between the substrates evenly and the display media are filled and sealed in respective cells. Therefore, there is a drawback such that the display media are sandwiched at a connection portion between the substrate and the partition walls or at a connection portion between the partition walls when two substrates are sandwiched, and thus a distance between the substrates cannot be made even.

Moreover, in order to solve the drawbacks mentioned above such that the display media are mounted on the top portions of the partition walls, there is a trial such that the charged particles are introduced into the cell so as to fill the colored particles for display media by applying an inverse potential as that of the particles to a rear side of the substrate to which the particles are to be filled.

However, in this method, if two groups of the colored particles having different charge polarity are to be filled, the first group of the particles can be filled without problems. However, when the second group of the particles are to be filled, there is a drawback such that the particles previously filled are jumped out of the cell.

Moreover, in this method, when the display media filled in the cell are transferred to the next process, there is a drawback such that the particles filled in the cell are jumped out of the cell due to external influence of vibration, wind and so on.

Further, in this method, there is a drawback such that, if the display media are not only filled in the cell but adhere on the partition walls for forming the cell, the display media are sandwiched to a gap between the substrate and the top of the partition walls in the case of laminating the other substrate, and thus a distance between the panel substrates is not made even. In order to solve the problems mentioned above, there is proposed a method for preventing an adhesion of the display media to the partition walls by providing a mask having an opening corresponding to the cell shape on the partition walls for forming the cell. However, in this method, there is a drawback such that, if the mask is detached after filling the display media, the display media filled in the cell are moved out of the cell together with the mask.

Furthermore, in this method, in the case such that the charged particles are introduced into the cell by applying an inverse potential as that of the particles to a rear side of the substrate, a filling operation can be performed successfully if there is no electrode on the substrate. However, in the case such that the electrode is provided on the substrate and the electrode is arranged between a potential applying means having an inverse polarity at a rear side of the substrate and the display media in the cell, there is a drawback such that the filling operation can not be performed. The problems mentioned above occur in the same manner even in a method of directly dispersing the display media or even in a method of moving the charged particles provided on a charge medium such as a photo conductor and so on, and the particles can not be filled precisely if the electrode is provided to the substrate.

DISCLOSURE OF THE INVENTION

The present invention has for its main object to eliminate the drawbacks mentioned above and to provide a method of manufacturing an information display panel, which can fill a predetermined amount of display media surely in a cell even if the display media are filled in the cell formed by the partition walls between the opposed substrates.

According to the invention, a method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, is characterized in that a display media filling process for filling the display media in the cell comprises: a display media charging and supporting process for supporting charged display media; a display media aligning process for aligning the supported display media corresponding to an electrostatic latent image; and a display media transferring and filling process for transferring and filling the aligned display media in the cell.

As a preferred embodiment of the method of manufacturing the information display panel according to invention, there are cases: such that the display media charging and supporting process is performed by supplying the charged display media from a display media charging and supplying device to a display media supporting roller; such that the display media aligning process is performed by forming the electrostatic latent image having a predetermined pattern on a surface of a photosensitive drum by means of an electrostatic latent image forming device, and aligning the display media on the basis of the electrostatic latent image on the photosensitive drum; such that the display media transferring and filling process is performed by passing the substrate with the cell through a space between the aligned display media and a transferring device, and transferring and filling the display media in the cell; such that the display media filling process is arranged successively by the number of groups of the display media to be filled; and such that the display media filling process is arranged by the number of groups of the display media respectively with the two substrates and they are arranged in parallel.

According to the method of manufacturing the information display panel of the invention mentioned above, it is possible to provide the method of manufacturing the information display panel, which can not generate an insufficiency and an unevenness of filling amount, which can prevent remaining display media on the top portions of the partition walls, which can make a distance between the substrates even, and which can obtain a display state having an excellent contrast, when the display media are filled in the cell formed by the partition walls between the information display panel substrates.

Moreover, the preferred embodiment of the present invention has for its first object to eliminate the drawbacks mentioned above and to provide a method of manufacturing an information display media, in which the particles previously filled are not jumped out of the cell even in the case such that two groups of display media having different charge polarity.

According to the first preferred embodiment of the invention, the display media transferring and filling process comprises: a first display media filling process for filling the display media in the cell by arranging the display media charged at one polarity on the cell of the substrate, and applying a potential with the other polarity which is an inverse polarity as that of the display media from a rear side of the substrate; an electricity removing process for performing an electricity removing with respect to the display media filled in the cell; and a second display media filling process for filling the display media in the cell by arranging the display media charged at the other polarity on the cell in which the display media charged at one polarity are filled, and applying a potential with one polarity which is an inverse polarity as that of the display media from a rear side of the substrate.

As a further preferred embodiment of the first preferred embodiment of the invention, there is a case such that two groups of the display media having different charged polarity have different colors.

In the method of manufacturing the information display panel according to the first preferred embodiment of the invention, since the electricity removing process is performed between the first display media filling process and the second display media filling process, the display media previously filled are not jumped out of the cell, even if second group of the display media are introduced into the cell by applying a potential having same polarity as that of the display media previously filled to a rear side of the substrate, in the case of filling the second group of the display media having different charge polarity.

Further, the preferred embodiment of the present invention has for its second object to eliminate the drawbacks mentioned above and to provide a method of manufacturing an information display panel, in which the particles previously filled are not jumped out of the cell in the case of moving the display media filled in the cell to the next process.

According to the second preferred embodiment of the invention, the display media transferring and filling process comprises: a display media filling process for filling the display media in the cell by arranging the display media charged at one polarity on the cell of the substrate, and applying a potential with the other polarity which is an inverse polarity as that of the display media from a rear side of the substrate; and a panel transporting process after filling for transporting the substrate whose cells are filled by the display media to a next process under a condition such that a potential with the other polarity which is an inverse polarity as that of the display media is applied to a rear side of the substrate.

As a further preferred embodiment of the second preferred embodiment of the invention, there are cases: such that the panel transporting process after filling is performed by transporting the substrate in which the display media are filled by means of a transporting means; and applying a predetermined voltage from a voltage applying auxiliary means arranged at a reverse side of the substrate on the transporting means during the transporting operation; such that the voltage applying auxiliary means is a successive plural voltage applying rollers; and such that the voltage applying auxiliary means is a voltage applying belt.

In the method of manufacturing the information display panel according to the second preferred embodiment of the invention, since a potential having an inverse polarity as that of the display media filled at a rear side of the substrate is applied continuously, the display media are fixed in the cell due to an attraction force acting from a rear side of the substrate, and thus they are not jumped out of the cell if the external influence such as vibration and wind.

Furthermore, the preferred embodiment of the present invention has for its third object to eliminate the drawbacks mentioned above and to provide a method of manufacturing an information display panel, in which, even in the case of detaching a mask after filling the display panel in the cell through the mask arranged on the partition walls, the display media filled in the cell are not jumped out of the cell, and thus an amount of the display media filled in the cell can be made constant.

According to the third preferred embodiment of the invention, the display media transferring and filling process comprises: a display media filling process for filling the display media charged at one polarity in the cell by providing a mask on the partition walls and applying a potential with the other polarity which is an inverse polarity as that of the display media from a rear side of the substrate; and a mask removing process for removing the mask from the partition walls under a condition such that a potential with the other polarity which is an inverse polarity as that of the display media filled in the cell from a rear side of the substrate.

In the method of manufacturing the information display panel according to the second preferred embodiment of the invention: the display media are charged; a potential having an inverse polarity as that of the display media is applied to a rear side of the substrate, to which the display media are to be filled, so as to fill the display media in the cell in such a manner that the charged particles are introduced into the cell; and the display media are filled in the cell under such a condition that the particles do not adhere to the partition walls by using the mask. Moreover, when the mask is detached from the panel substrate in which the display media are filled, a potential having an inverse polarity as that of the display media filled at a rear side of the substrate is applied continuously. By doing so, when the mask is detached from the panel substrate in which the display media are filled, the display media are fixed in the cell due to an attraction force acting from a rear side of the substrate, and thus they are not accompanied with the mask to be detached. Therefore, an amount of the display media filled in the cell can be made constant.

Moreover, the preferred embodiment of the present invention has for its fourth object to eliminate the drawbacks mentioned above and to provide a method of manufacturing an information display panel, in which the display media can be filled in the cell precisely in the case of arranging an electrode to the substrate.

According to a first embodiment of the fourth preferred embodiment of the invention, the display media transferring and filling process comprises: a display media filling process for filling the display media charged at one polarity on the cell of the substrate, applying a potential with the other polarity which is an inverse polarity as that of the display media from a rear side of the substrate, and applying an alternating voltage to an electrode arranged on the substrate.

According to a second embodiment of the fourth preferred embodiment of the invention, the display media transferring and filling process comprises: a display media filling process for filling the display media in the cell by arranging the display media charged at one polarity on the cell of the substrate, applying a potential with the other polarity which is an inverse polarity as that of the display media from a rear side of the substrate, applying a potential V1 to an electrode arranged on the substrate, applying a potential V2 to a rear side of the substrate, and controlling a relation between potentials to |V1|<|V2|.

In the method of manufacturing the information display panel according to the fourth preferred embodiment of the invention, since the display media are filled in the cell under such a condition that an alternating voltage is applied to the electrode arranged between the potential applying means having an inverse polarity at a rear side of the substrate and the charged particles in the cell (first embodiment), or, since the display media are filled in the cell by applying a potential V1 to an electrode arranged on the substrate, applying a potential V2 to a rear side of the substrate, and controlling a relation between potentials to |V1|<|V2| (second embodiment), the charged display media provided on the charge medium can be moved easily to a substrate side, and thus the display media can be filled in the cell precisely.

Further, as a further preferred embodiment of the method of manufacturing the information display panel mentioned above, the display media are particles or liquid powders.

BRIEF DESCRIPTION OF THE DRAWINGS

FIGS. 7a and 7b are schematic views respectively explaining one preferred embodiment of the cell opening shape and the electrostatic latent image corresponding thereto.

FIGS. 8a and 8b are schematic views respectively explaining another preferred embodiment of the cell opening shape and the electrostatic latent image corresponding thereto.

FIGS. 9a and 9b are schematic views respectively explaining still another preferred embodiment of the cell opening shape and the electrostatic latent image corresponding thereto.

FIGS. 10a and 10b are schematic views respectively explaining still another preferred embodiment of the cell opening shape and the electrostatic latent image corresponding thereto.

FIG. 26 is a schematic view illustrating one embodiment of the mask shape, which is used in the manufacturing method according to the invention.

BEST MODE FOR CARRYING OUT THE INVENTION

At first, a basic construction of an information display panel using the display media constituted by the particles for display media according to the invention will be explained. In the information display panel using the particles according to the invention, an electrostatic field is applied to the display media sealed between opposed two substrates. Along a direction of the applied electrostatic field, charged display media are attracted by means of a force due to electrostatic field or Coulomb's force, and, the display media are moved reciprocally by varying a direction of the electrostatic field due to a potential switching, so that information such as an image can be displayed. Therefore, it is necessary to design the information display panel in such a manner that the display media can move evenly and maintain stability during a reciprocal operation or during a display information reserving state. Here, as to forces applied to the particles constituting the display media, there are an attraction force between the particles due to Coulomb' force, an imaging force with respect to the electrode or the substrate, an intermolecular force, a liquid bonding force and a gravity.

Examples of the information display panel according to the invention will be explained with reference to FIGS. 1a and 1b-FIGS. 3a and 3b.

Figure 1:
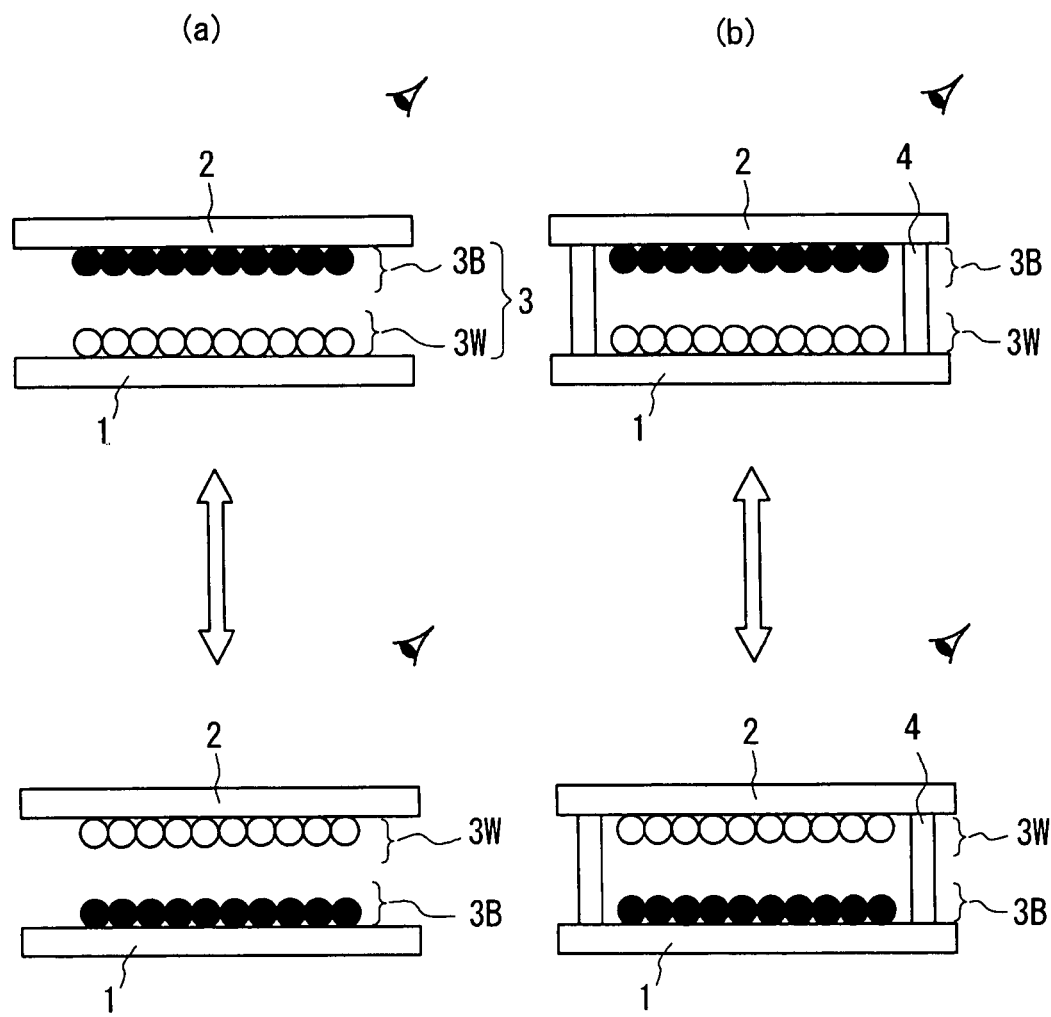
FIGS. 1a and 1b are schematic views respectively showing one embodiment of the information display panel, which is an object of the manufacturing method according to the invention.

In the example shown in FIGS. 1a and 1b, at least two or more groups of display media having different optical reflectance and different charge characteristics and comprising at least one or more groups of particles (here, white color display media 3W constituted by the particles made of the particles and black color display media 3B constituted by the particles are shown) are sealed between the substrate 1 and the substrate 2 and moved in a perpendicular direction with respect to substrates 1 and 2, in accordance with an electric field generated between the substrates by means of some kind of voltage apply means, so as to display a black color by viewing the black color display media 3B to an observer or so as to display a white color by viewing the white color display media 3W to the observer. In the example shown in FIG. 1b, a cell is formed by arranging for example grid-like partition walls 4 between the substrates 1 and 2 (in FIG. 1, the partition walls arranged at the near side are omitted).

Figure 2:
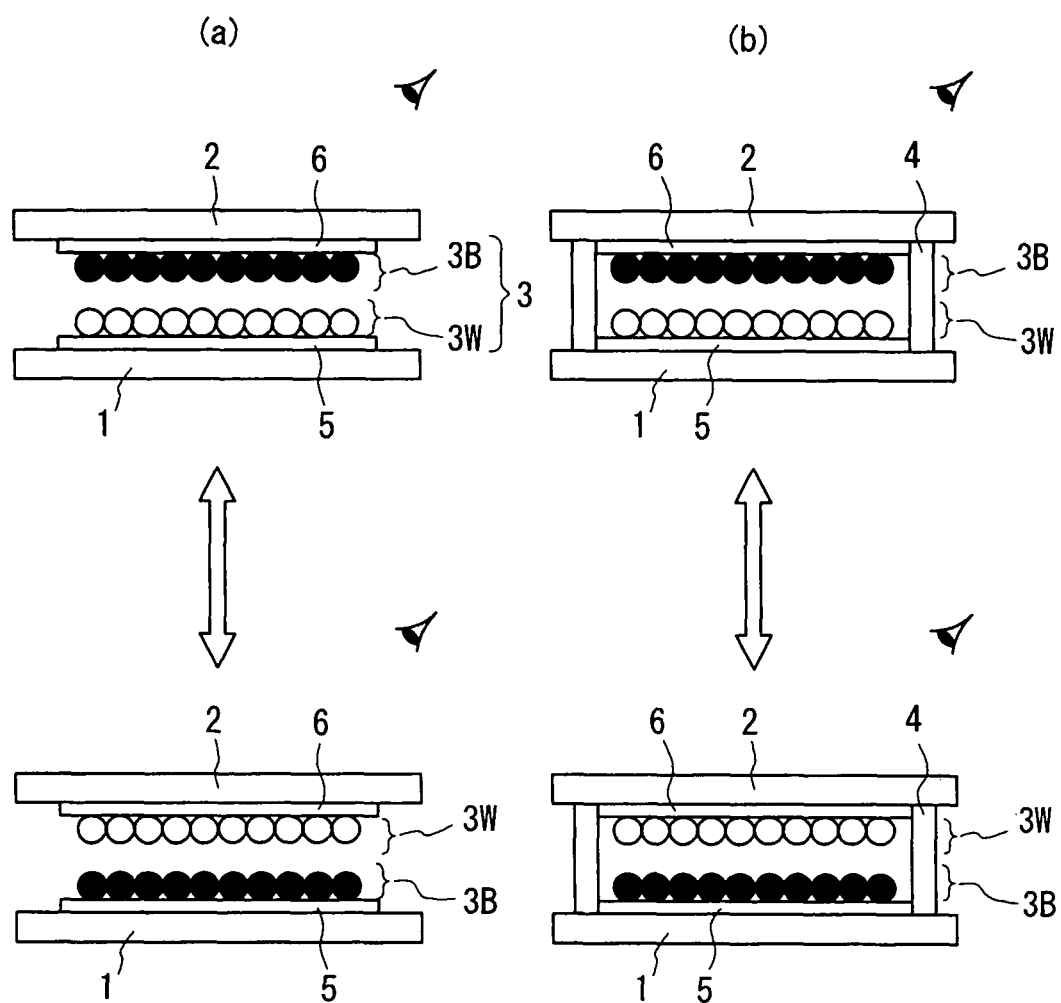
FIGS. 2a and 2b are schematic views respectively illustrating another embodiment of the information display panel, which is an object of the manufacturing method according to the invention.

In the example shown in FIGS. 2a and 2b, at least two or more groups of display media having different colors and different charge characteristics and comprising at least one or more groups of particles (here, white color display media 3W constituted by the particles and black color display media 3B constituted by the particles are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 2b, a cell is formed by arranging for example grid-like partition walls 4 between the substrates 1 and 2 (in FIG. 2, the partition walls arranged at the near side are omitted).

Figure 3:
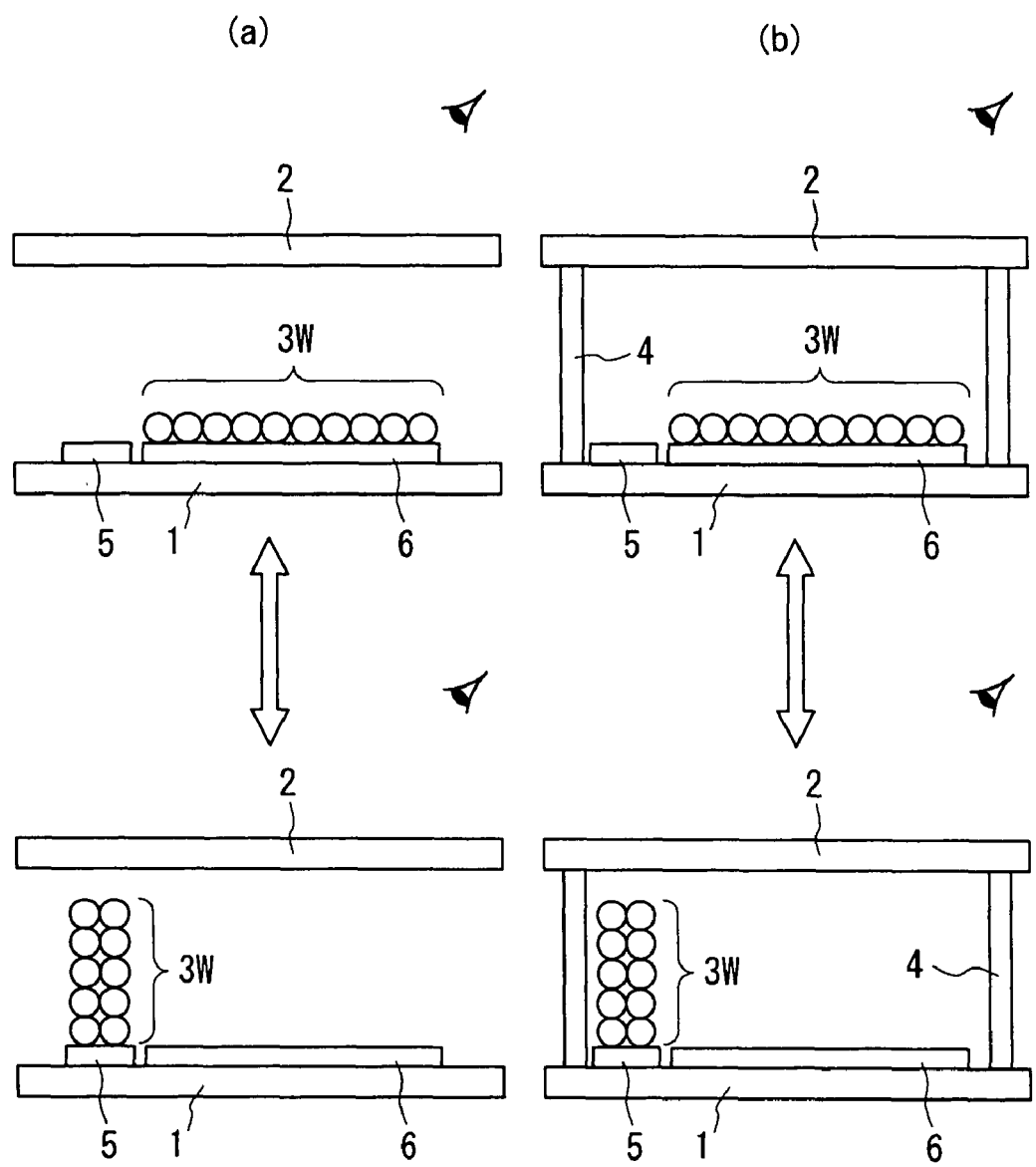
FIGS. 3a and 3b are schematic views respectively depicting still another embodiment of the information display panel, which is an object of the manufacturing method according to the invention.

In the example shown in FIGS. 3a and 3b, one group of display media having one color and one charge characteristic and comprising at least one or more groups of particles (here, white color display media 3W constituted by the particles are shown) is moved in a parallel direction with respect to substrates 1 and 2, in accordance with an electric field generated by applying a voltage between the electrode 5 arranged to the substrate 1 and the electrode 6 arranged to the substrate 2, so as to display a white color by viewing the white color display media 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2 (in FIG. 3, the partition walls arranged at the near side are omitted).

The electrodes may be arranged outside of the substrate or may be embedded in the substrate.

The above explanations can be applied to a case such that the white color particles 3W are substituted by white color liquid powders or a case such that the black color particles 3B are substituted by black color liquid powders.

<Explanation of Main Invention>

When the information display panel having the construction mentioned above, the feature of the main invention is that a display media filling process for filling the display media in the cell comprises: a display media charging and supporting process for supporting charged display media; a display media aligning process for aligning the supported display media corresponding to an electrostatic latent image; and a display media transferring and filling process for transferring and filling the aligned display media in the cell. Hereinafter, the method of manufacturing the information display panel according to the main invention will be explained in further detail with reference to the drawings.

Figure 4:
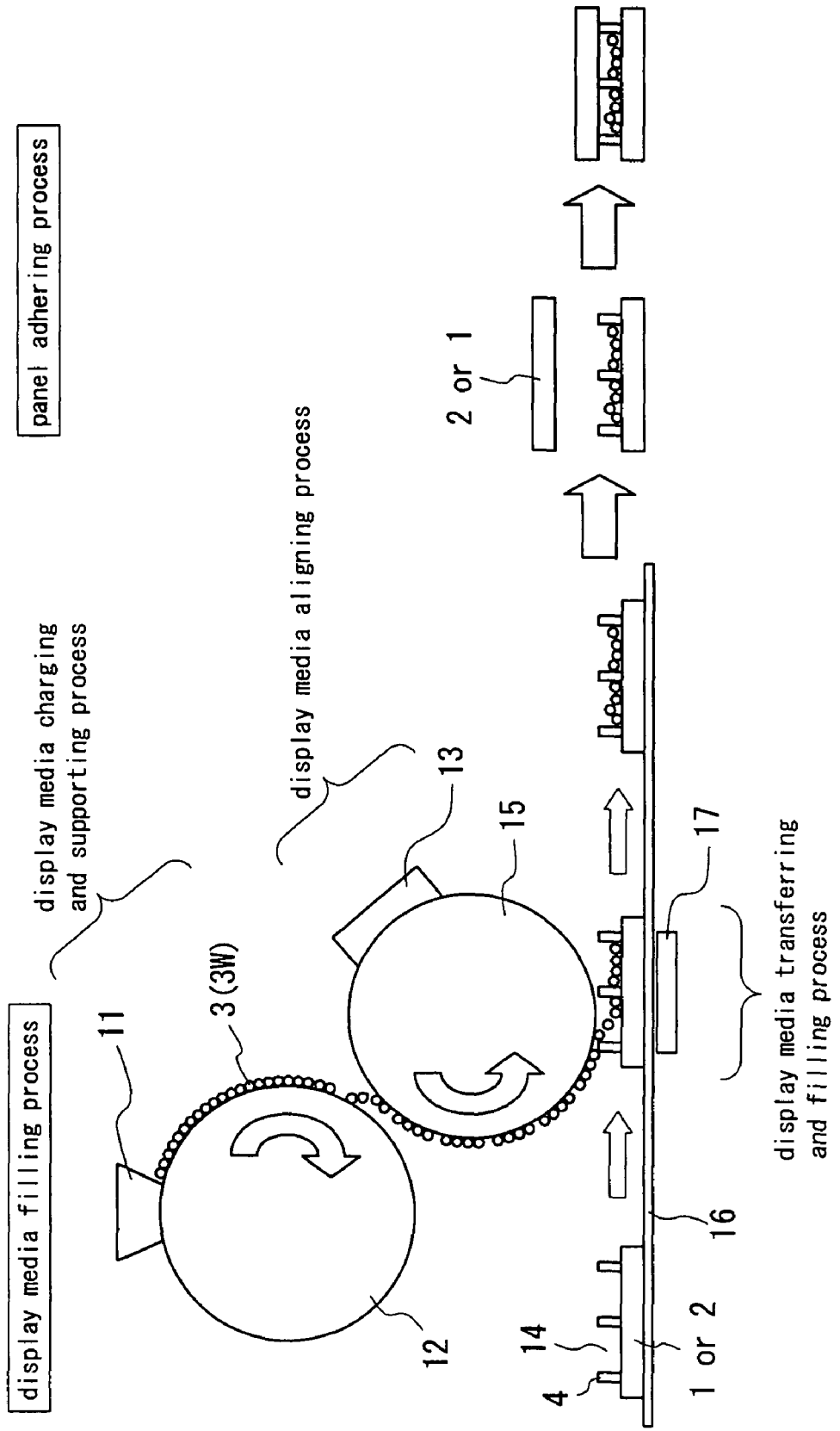
FIG. 4 is a schematic view explaining one embodiment of the method of manufacturing the information display panel according to the main invention.

FIG. 4 is a schematic view explaining one embodiment of the method of manufacturing the information display panel according to the invention. In the embodiment shown in FIG. 4, the display media filling process, which is the feature of the manufacturing method according to the invention, and the successive panel adhering process are shown. In the embodiment shown in FIG. 4, firstly, the charged display media 3 (here, white color display media) are supplied from a display media charging and supplying device 11 to a display media supporting roller 12 (display media charging and supporting process).

Then, an electrostatic latent image having a predetermined pattern (for example, a pattern corresponding to a cell pattern of a cell 14 formed by the partition walls 4 on the substrate 1 of the panel) is formed on a surface of a photo-conductor drum 15 by means of an electrostatic latent image forming device 13, and the display media 3, which are supported by the display media supporting roller 12 on a surface of the photo-conductor drum 15, are supplied by rotating the display media supporting roller 12. Thereby, the display media 3 are aligned and arranged along the predetermined pattern of the electrostatic latent image on the photo-conductor drum 15.

Under the photo-conductor drum 15, a transporting belt 16 for transporting the panel substrate 1 is traveled, and a transporting device 17 for transporting the display media 3 aligned on the photo-conductor drum 15 is arranged at a rear side of the transporting belt 16 opposed to the photo-conductor drum 15. When the panel substrate 1 transported by the transporting belt 16 is passed through a space between the photo-conductor drum 15 and the transferring device 17, the display media 3 aligned and arranged on the photo-conductor drum 15 is transferred and filled in the cell 14 on the panel substrate 1 (display media transferring and filling process).

After the display media filling process mentioned above is finished, the information display panel can be obtained by attaching another substrate 2 by using adhesive agents, with respect to the substrate 1 in which predetermined display media 3 are filled in the cell 14 (panel adhering process).

In the embodiment mentioned above, the display media 3 on the display media supporting roller 12 and the photo-conductor drum 15 are arranged by one layer, but one layer is not necessary and it is possible to use two or more layers corresponding to a filling amount in the cell 14. Moreover, in the embodiment mentioned above, the electrostatic latent image on the photo-conductor drum 15 corresponds to the cell pattern, i.e., the display media 3 are not arranged to a portion corresponding to the partition walls 4 by arranging no electrostatic latent image. However, the pattern of the electrostatic latent image is not limited to the cell pattern, and the electrostatic latent image may be applied so as to provide the display media 3 on an overall surface. Further, the pattern of the electrostatic latent image may be a region narrower than the opening portion of the cell, which corresponds to a position of the cell 14 formed by the partition walls 14 on the substrate.

Figure 5:
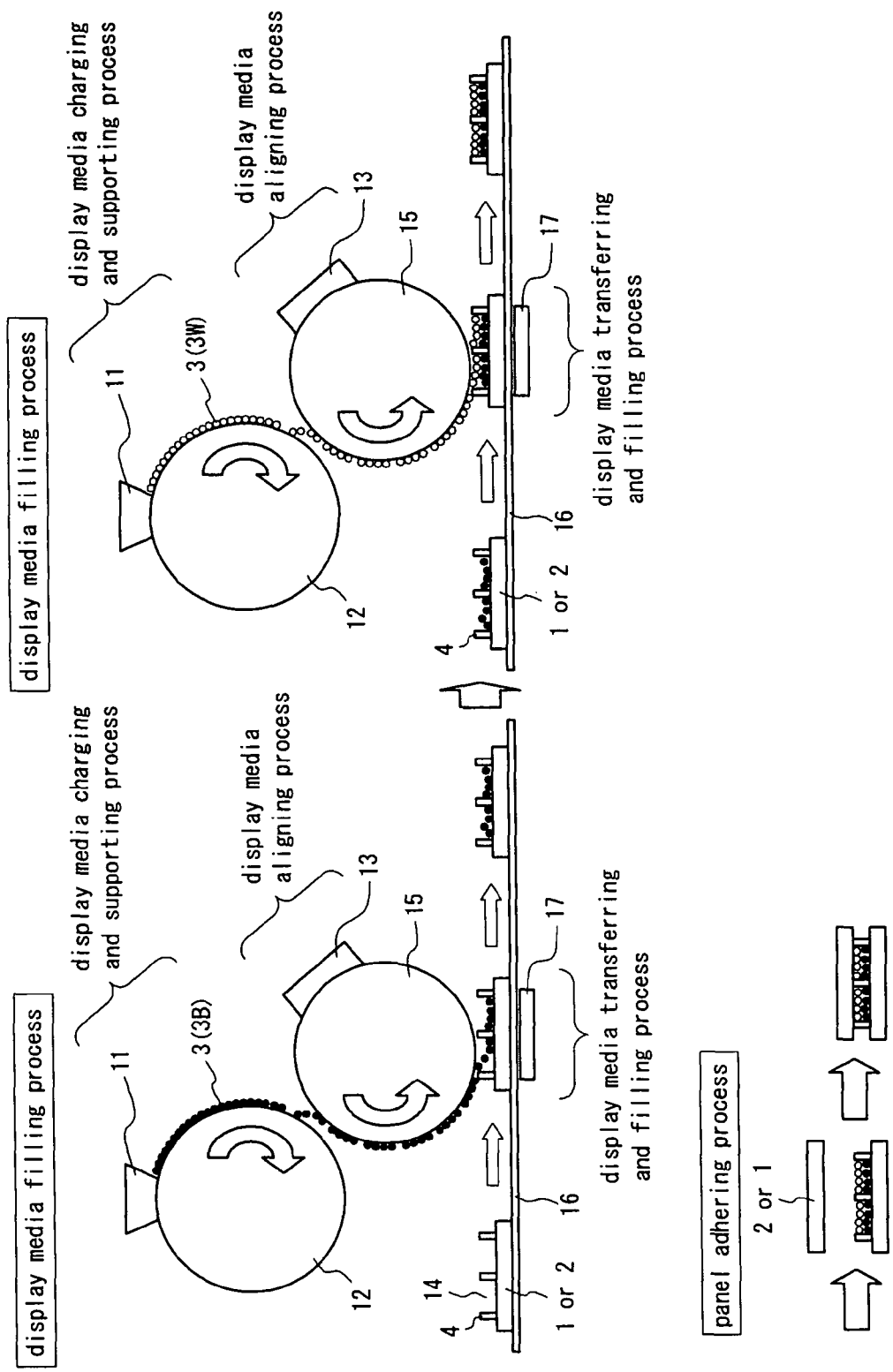
FIG. 5 is a schematic view explaining another embodiment of the method of manufacturing the information display panel according to the main invention.
Figure 6:
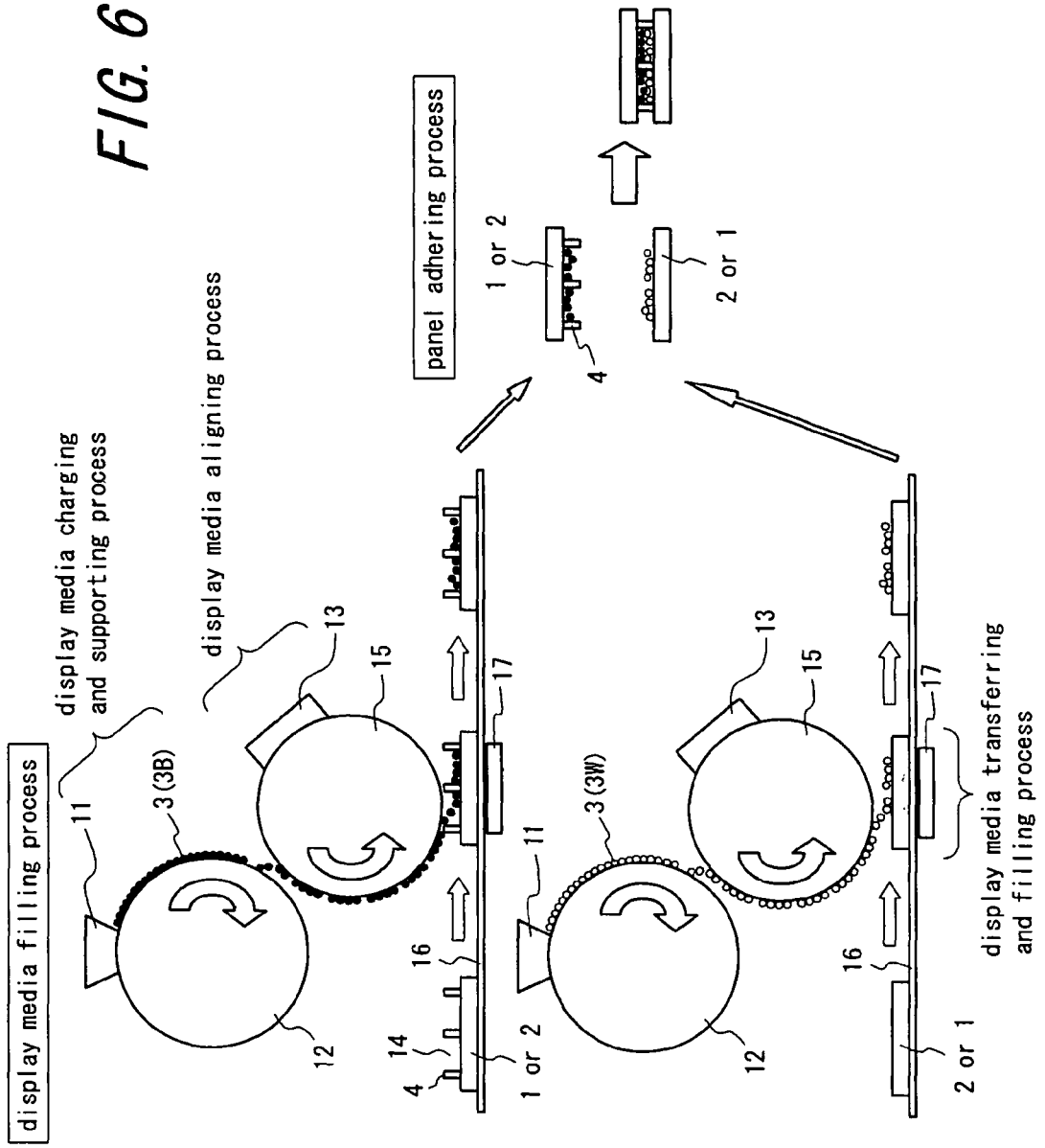
FIG. 6 is a schematic view explaining still another embodiment of the method of manufacturing the information display panel according to the main invention.

FIG. 5 is a schematic view explaining another embodiment of the method of manufacturing the information display panel according to the invention. In the embodiment mentioned above, two display media filling processes shown in FIG. 4 are arranged in successive so as to fill the black color display media 3B and the white color display media 3W between the panel substrates, and then the panels are attached by using the adhesive agents. Moreover, FIG. 6 is a schematic view explaining still another embodiment of the method of manufacturing the information display panel according to the invention. In the embodiment shown in FIG. 6, two display media filling processes shown in FIG. 4 are arranged in parallel so as to fill the black color display media 3B and the white color display media 3W respectively in two panel substrates, and then the panels are attached by using the adhesive agents.

FIGS. 7a and 7b-FIGS. 10a and 10b are schematic views respectively explaining a preferred embodiment of the cell opening shape and the electrostatic latent image pattern corresponding thereto. In these embodiments, as a preferred embodiment, the pattern of the electrostatic latent image (FIG. 7b, FIG. 8b, FIG. 9b, FIG. 10b) is narrower than the opening of the cell formed by the partition walls 4 on the substrate (FIG. 7a, FIG. 8a, FIG. 9a, FIG. 10a).

Explanation of First Preferred Embodiment

Figure 11:
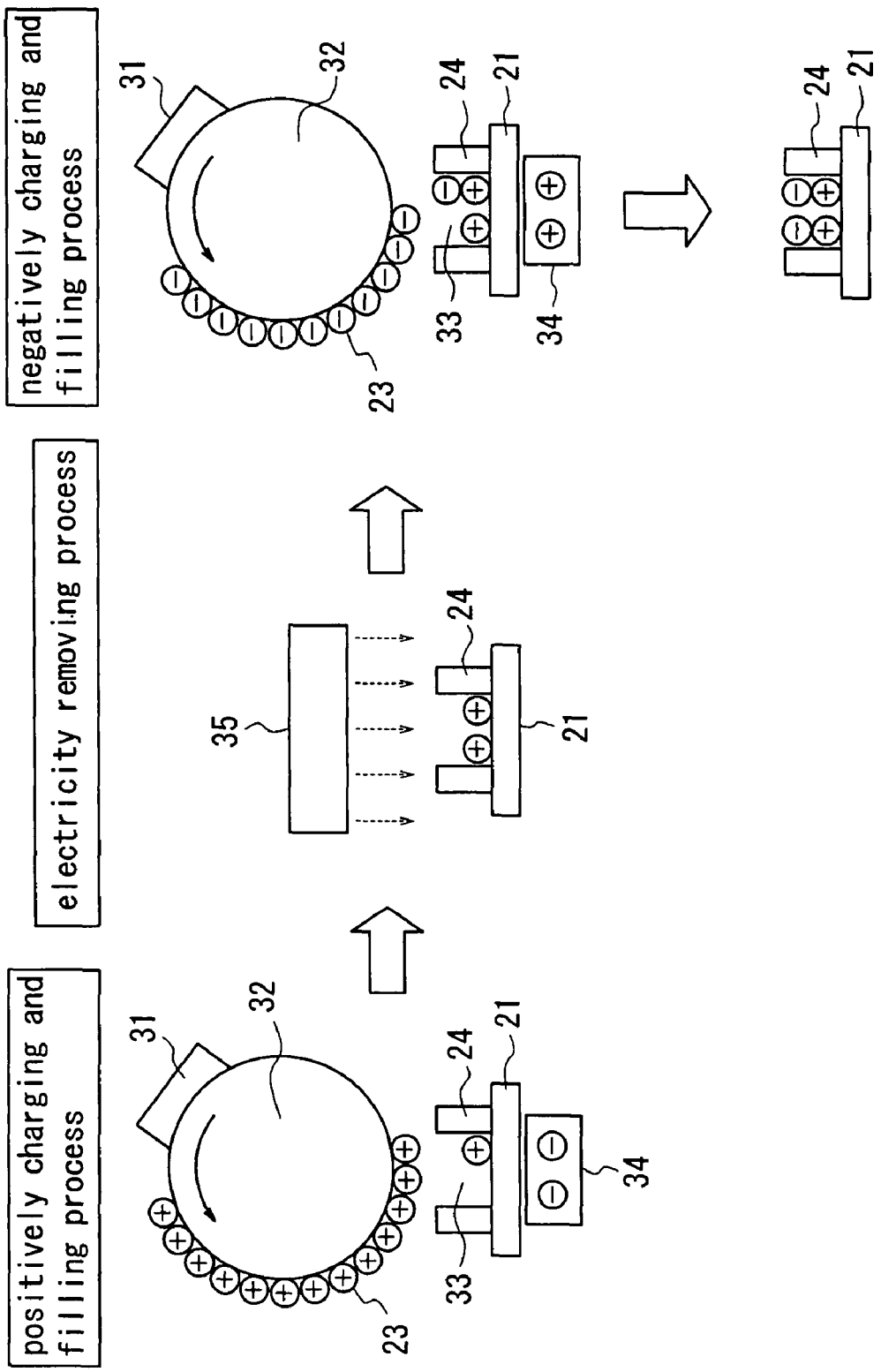
FIG. 11 is a schematic view explaining one embodiment of the method of manufacturing the information display panel according to the first preferred embodiment of the invention.

FIG. 11 is a schematic view explaining one embodiment of the method of manufacturing the information display panel according to the first preferred embodiment of the invention. In the embodiment shown in FIG. 11, a first display media filling process is a positively charging and filling process for filling the positively charged display media, and a second display media filling process is a negatively charging and filling process for filling the negatively charged display media. Then, the display media filling process for filling the display media in the cell is constructed by the positively charging and filling process, an electricity removing process and the negatively charging and filling process. Hereinafter, respective processes will be explained with reference to FIG. 11.

In the positively charging and filling process, firstly, positively charged display media 23 are supported on the charge medium such as the photo-conductor, here, photo-conductor roller 32 by using a charging device 31. With respect to a substrate 21 having a cell 33 formed by the partition walls 24 in which the display media 23 are to be filled, a transferring device 34 is arranged at a rear side i.e. an opposed side of the substrate 21 on which the cell 33 is arranged. The transferring device 34 is constructed in such a manner that a negative potential here, which is an inverse polarity as that of the display media 23, can be applied. Then, by rotating the photo-conductor roller 32, the positively charged display media 23 transported on the cell 33 are introduced and filled in the cell 33 due to a negative potential applied from the transferring device 34.

Then, in the electricity removing process, an electricity removing is performed by an electricity removing device 35 with respect to the positively charged display media 23 filled in the cell 33, after the positively charging and filling process is finished. In the electricity removing process, a charge level of the positively charged display media 23 is decreased by the electricity removing, and thus a level of the electricity removing is controlled in such a manner that a charge amount necessary as the positively charged display media 23 can remain.

Then, in the negatively charging and filling process, negatively charged display media 23 are filled on the positively charged display media 23 previously filled in the cell 33. This filling process is substantially same as that of the positively charging and filling process mentioned above. That is, firstly, the negatively charged display media 23 are supported on the charge medium such as the photo-conductor, here, the photo-conductor roller 32 by using the charging device 31. With respect to the substrate 21 having the cell 33 formed by the partition walls 24 in which the display media 23 are to be filled, a transferring device 34 is arranged at a rear side i.e. an opposed side of the substrate 21 on which the cell 33 is arranged. The transferring device 34 is constructed in such a manner that a positive potential here, which is an inverse polarity as that of the display media 23, can be applied. Then, by rotating the photo-conductor roller 32, the negatively charged display media 23 transported on the cell 33 are introduced and filled in the cell 33, in which the positively charged display media 23 are previously filled, due to a positive potential applied from the transferring device 34.

In the first preferred embodiment according to the present invention, instead of the known method of dispersing the particles, use is made of a method of filling the display media 23 by: charging the display media 23 on the photo-conductor roller 32; applying a potential having an inverse polarity as that of the display media 23 to a rear side of the substrate 21 in which the display media 23 are to be filled; and introducing the charged display media 23 in the cell 33. Thereby, the substrate 21 to be filled and a position, at which the charged display media 23 start to move, become close, and thus it is possible to eliminate the drawback such that the display media 23 adhere to the partition walls 24. In addition, when two groups of the display media 23 having different polarity are filled, the electricity removing is performed by the electricity removing device 35 with respect to the display media 23 filled previously in the cell 33, prior to fill the second display media 23. By doing so, when the second group of the display media 23 having different polarity as that of the first group are filled, even if a potential having an inverse polarity as that of the display media 23 filled previously in the cell is applied to a rear side of substrate and the charged display media 23 are introduced into the cell 33, it is possible to eliminate the drawback such that the display media 23 filled previously are jumped out of the cell 33.

Figure 12:
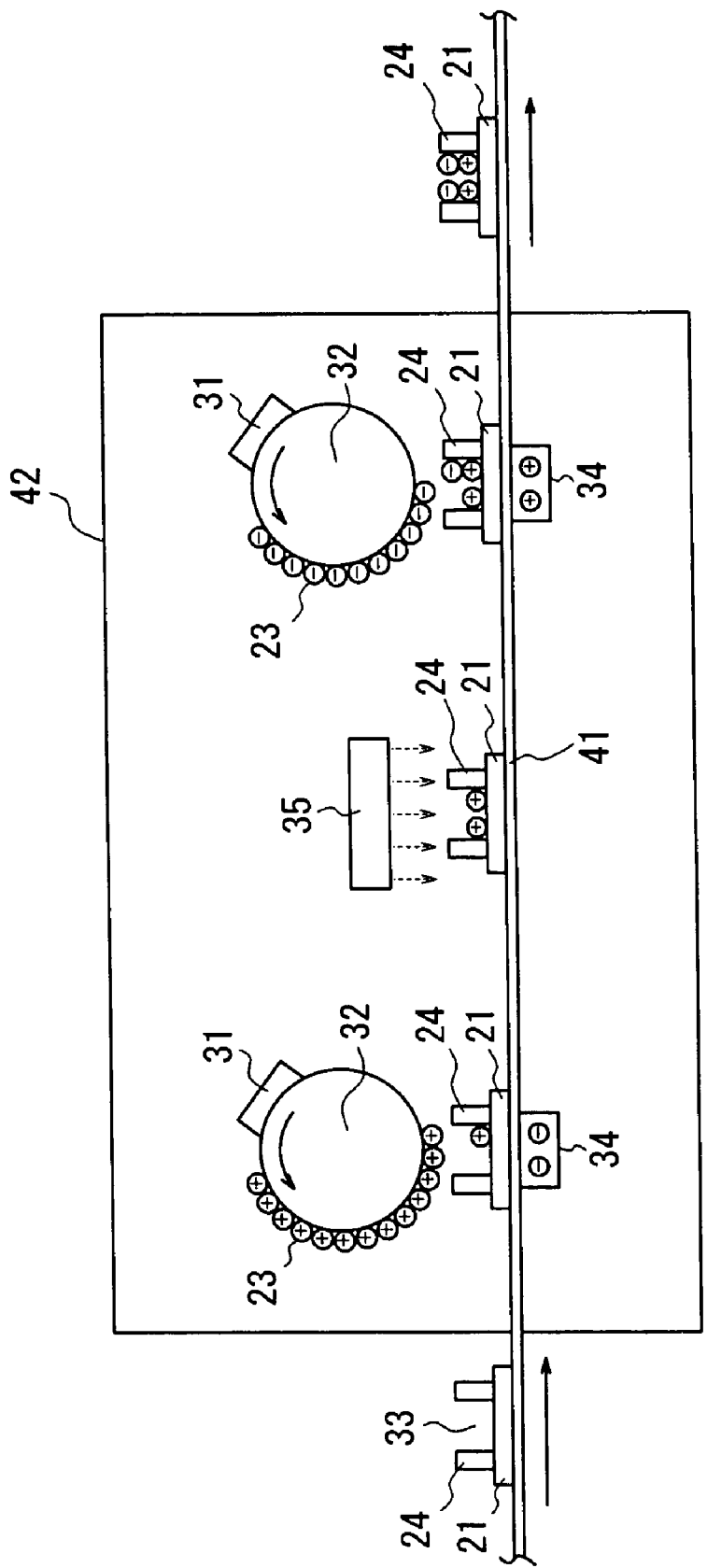
FIG. 12 is a schematic view explaining one embodiment of an apparatus for performing the method of manufacturing the information display panel according to the first preferred embodiment of the invention.

FIG. 12 is a schematic view explaining one embodiment of an apparatus for performing the method of manufacturing the information display panel according to the invention. As shown in FIG. 12, it is preferred to perform the method of manufacturing the information display panel according to the invention successively by using a display media filling device 42 constructed in such a manner that the positively charging and filling process, the electricity removing process, and the negatively charging and filling process mentioned above are performed on a transporting belt 41.

Explanation of Second Preferred Embodiment

Figure 13:
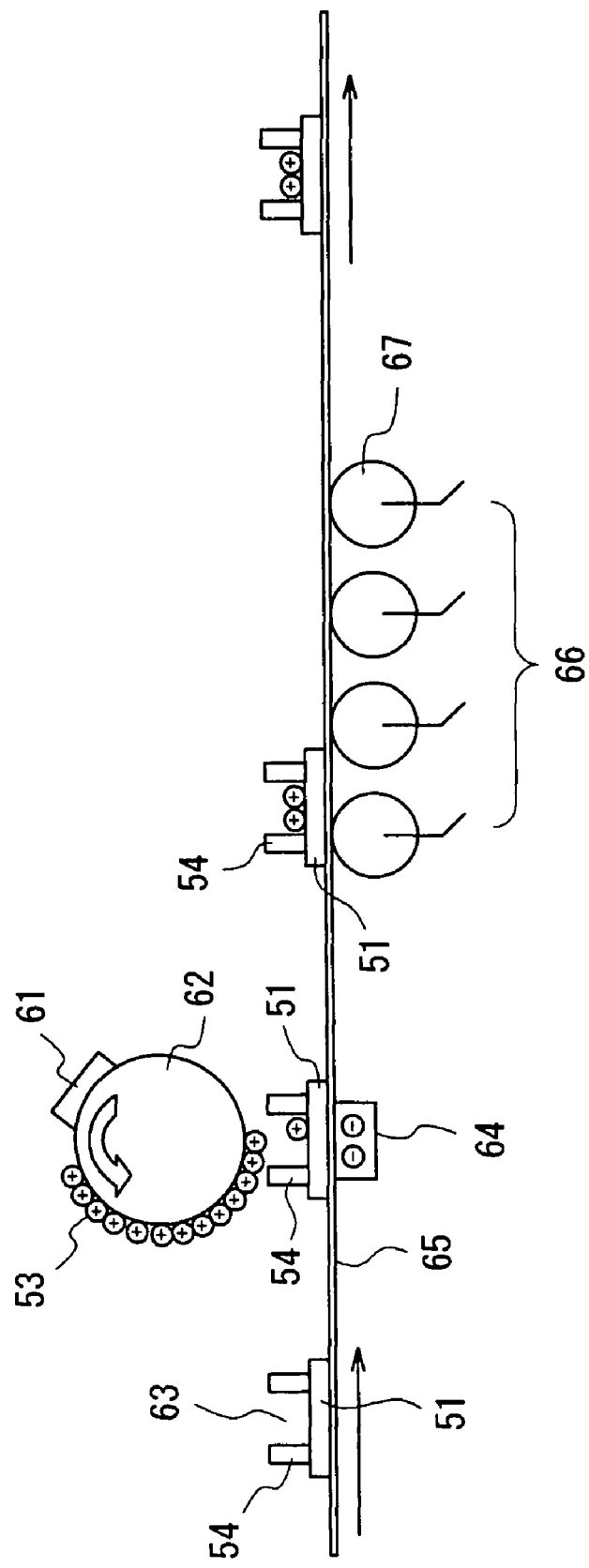
FIG. 13 is a schematic view explaining one embodiment of the method of manufacturing the information display panel according to the second preferred embodiment of the invention.

FIG. 13 is a schematic view explaining one embodiment of the method of manufacturing the information display panel according to the second preferred embodiment of the invention. In the embodiment shown in FIG. 13, the method of manufacturing the information display panel according to the invention is constructed by the display media filling process for filling the display media in the cell, and a panel transporting process after filling for transporting the substrate in which the display media are filled in the cell to the next process after filling the display media. Hereinafter, respective processes will be explained with reference to FIG. 13.

In the display media filling process, firstly, positively charged display media 53 as one example are supported on the charge medium such as the photo-conductor, here, photo-conductor roller 62 by using a charging device 61. With respect to a substrate 51 having a cell 63 formed by partition walls 54 in which the display media 53 are to be filled, a transferring device 64 is arranged at an opposed side of the substrate 51 on which the cell 63 is arranged. The transferring device 64 is constructed in such a manner that a negative potential here, which is an inverse polarity as that of the display media 53, can be applied. Then, by rotating the photo-conductor roller 62, the positively charged display media 53 transported on the cell 63 are introduced and filled in the cell 63 due to a negative potential applied from the transferring device 64. In this embodiment, it is constructed that the substrate 51 in which the display media 53 are filled in the cell 63 is transported by a transporting belt 65.

In the panel transporting process after filling, when the substrate 51 in which the display media 53 are filled in the cell 63 is transported to the next process by a movement of the transporting belt 65, the substrate 51 in which the display media 53 are filled in the cell 63 can be transported to the next process under such a condition that a negative potential here which is an inverse polarity as that of the display media 53 filled in the cell is applied to a rear side of the substrate 51. Specifically, as shown in FIG. 13, a predetermined negative voltage is applied to the substrate 51 from a plurality of successive voltage applying rollers 67 constituting a negative voltage applying device 66, which is arranged at an opposed side of the transporting belt 65 as a transporting means with respect to the substrate 51.

In the second preferred embodiment according to the present invention, instead of the known method of dispersing the particles, use is made of a method of filling the display media 53 by: charging the display media 53 on the photo-conductor roller 62; applying a potential having an inverse polarity as that of the display media 53 to a rear side of the substrate 51 in which the display media 53 are to be filled; and introducing the charged display media 53 in the cell 63. Thereby, the substrate 51 to be filled and a position, at which the charged display media 53 start to move, become close, and thus it is possible to eliminate the drawback such that the display media 53 adhere to the partition walls 54 and the display media 53 are filled in the cell 63. Moreover, when the panel substrate 51, in which the display media 53 are filled, is moved, a potential having an inverse polarity as that of the display media 53 filled in the cell is continuously applied to a rear side of the panel substrate. By doing so, when the panel substrate 51, in which the display media 53 are filled, is moved, since the display media 53 are fixed in the cell due to an attraction force acting from a rear side of the substrate, they are not jumped out of the cell 63 if the external forces such as vibration and wind are applied.

Figure 14:
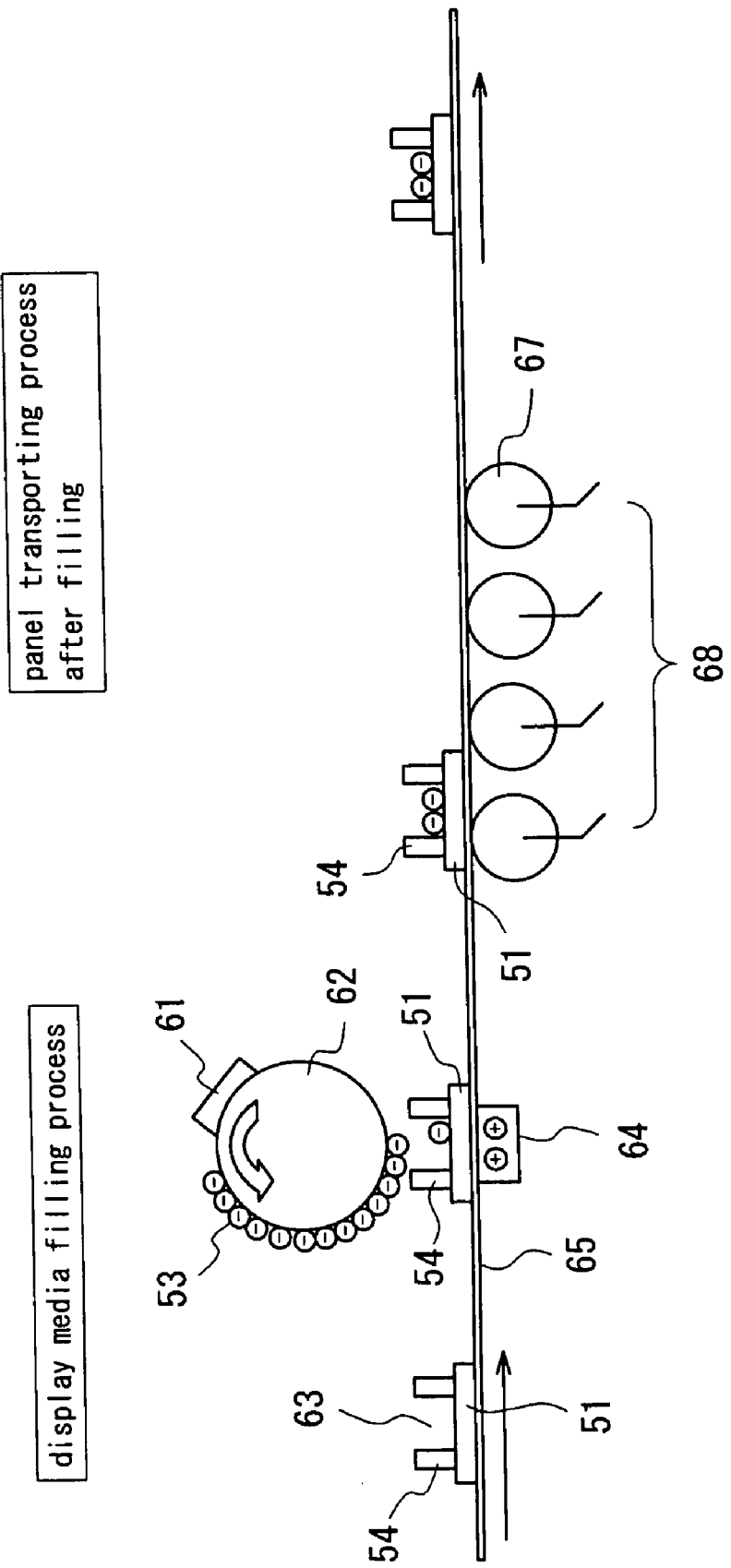
FIG. 14 is a schematic view explaining another embodiment of the method of manufacturing the information display panel according to the second preferred embodiment of the invention.

FIG. 14 is a schematic view explaining another embodiment of the method of manufacturing the information display panel according to the second preferred embodiment of the invention. In the embodiment shown in FIG. 14, a polarity of the display media 53 is negative, and thus a positive potential is applied from the transferring device 64 and use is made of the positive voltage applying device 68 constituted by a plurality of successive voltage applying rollers 67. Also in the embodiment shown in FIG. 14, the same functions and effects as those of the embodiment shown in FIG. 13 can be obtained except that a positive side and a negative side are reversed.

Figure 15:
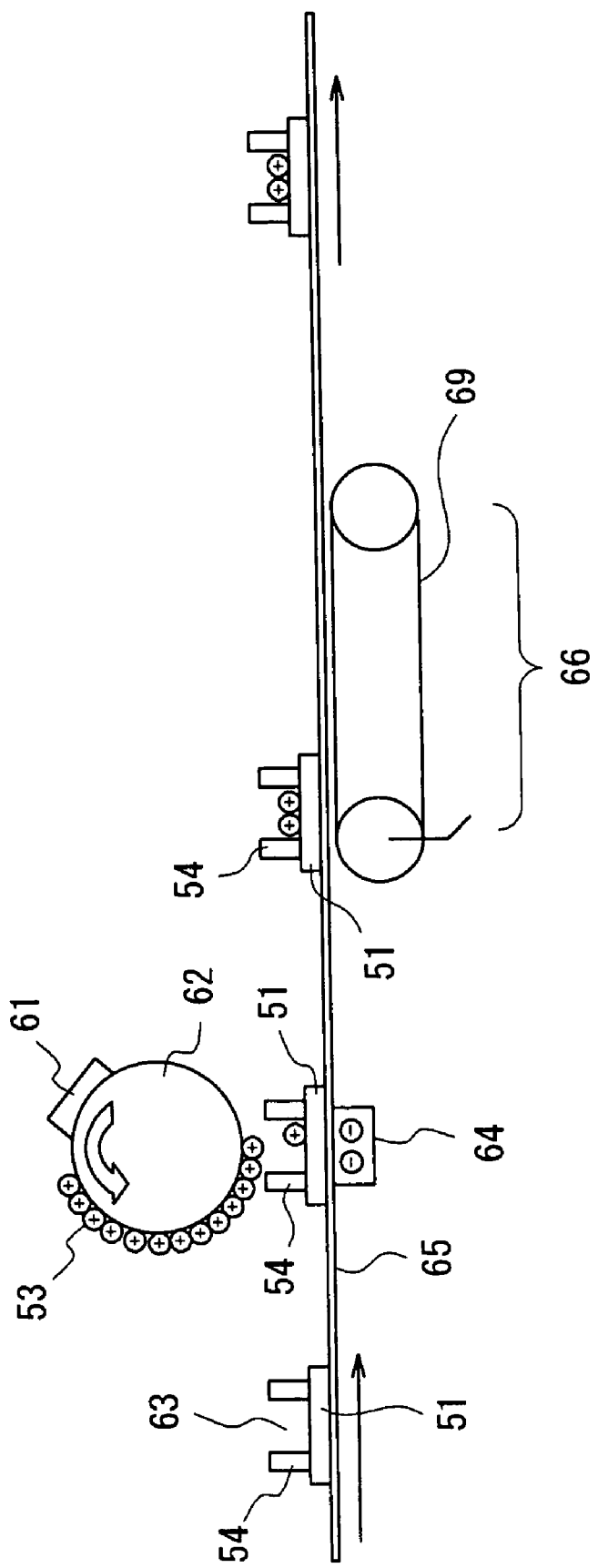
FIG. 15 is a schematic view explaining still another embodiment of the method of manufacturing the information display panel according to the second preferred embodiment of the invention.

FIG. 15 is a schematic view explaining still another embodiment of the method of manufacturing the information display panel according to the second preferred embodiment of the invention. In the embodiment shown in FIG. 15, instead of the negative voltage applying device 66 constituted by a plurality of successive voltage applying rollers 67, use is made of the negative voltage applying device 66 constituted by a negative voltage applying belt 69. Also in the embodiment shown in FIG. 15, the same functions and effects as those of the embodiment shown in FIG. 13 can be obtained.

Explanation of Third Preferred Embodiment

When the information display panel having the construction mentioned above, the feature of the third preferred embodiment according to the invention is that the display media transferring and filling process comprises: a display media filling process for filling the display media charged at one polarity in the cell by providing a mask on the partition walls and applying a potential with the other polarity which is an inverse polarity as that of the display media from a rear side of the substrate; and a mask removing process for removing the mask from the partition walls under a condition such that a potential with the other polarity which is an inverse polarity as that of the display media filled in the cell from a rear side of the substrate. Hereinafter, the method of manufacturing the information display panel according to the third preferred embodiment of the invention will be explained further in detail with reference to the drawings.

Figure 16:
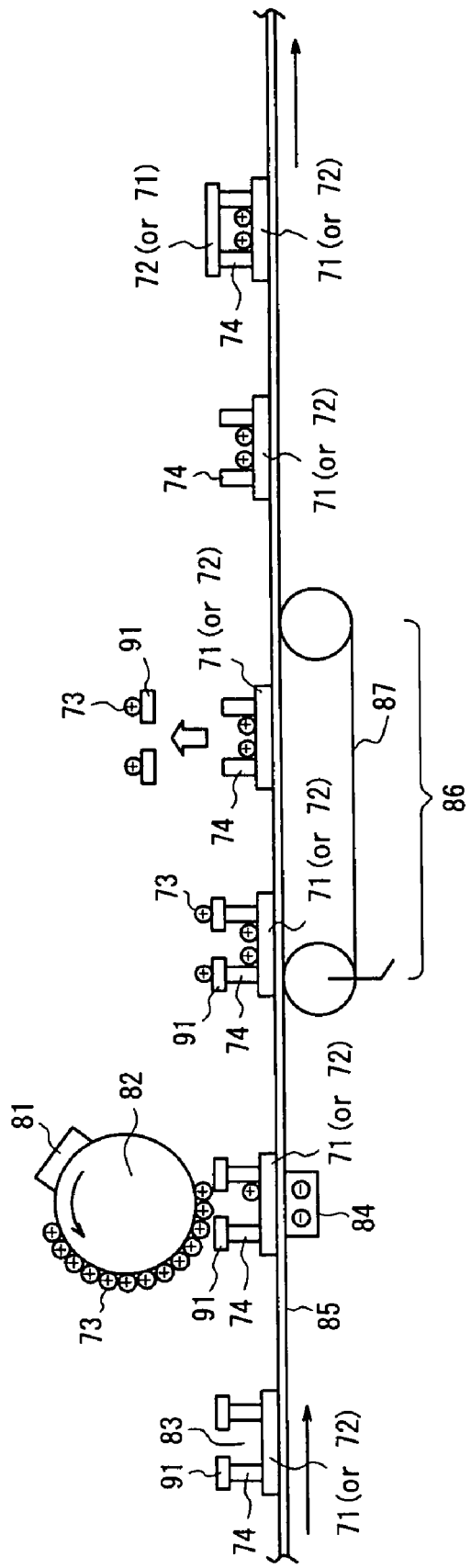
FIG. 16 is a schematic view explaining one embodiment of the method of manufacturing the information display panel according to the third preferred embodiment of the invention.

FIG. 16 is a schematic view explaining one embodiment of the method of manufacturing the information display panel according to the third preferred embodiment of the invention. In the embodiment shown in FIG. 16, firstly, a mask 91 having an opening corresponding to a cell shape is provided on partition walls 74 constituting a cell 83 arranged on a substrate 71 (or 72) to which display media 73 are to be filled. Hereinafter, the display media filling process, a mask removing process and a panel assembling process are performed.

In the display media filling process, firstly, the display media 73 having for example positive polarity are supported on the charge medium such as a photo-conductor, here, a photo-conductor roller 82 by means of a charging device 81. With respect to the substrate 71 (or 72) having the cell 83, to which the display media 73 are to be filled, formed by the partition walls 74 on which the mask 91 is provide, a transferring device 84 is arranged at an inverse side of a side at which the cell 83 is arranged. By using the transferring device 84, an inverse polarity as that of the display media 73, here, a negative potential can be applied. Then, by rotating the photo-conductor roller 82, the positively charged display media 73 are introduce and filled into the cell 83 through the mask 91 due to a negative potential applied from the transferring device 84. In this embodiment, the substrate 71 wherein the display media 73 are filled in the cell 83 can be transported by a transporting belt 85.

In the mask removing process, when the substrate wherein the display media 73 are filled in the cell 83 is transported to the next process by a movement of the transporting belt 85, the mask 91 is removed from the partition walls 74 under such a condition that a negative potential having an inverse polarity as that of the display media 73 previously filled in the cell is applied. Specifically, as shown in FIG. 16, a predetermined negative potential is applied to the substrate 71 from a voltage applying belt 87 constituting a suction potential applying device 86 for applying a negative voltage here, which is arranged at an inverse side of the transporting belt 85 as that of the substrate 71 (or 72).

In the panel assembling process, after the mask removing process mentioned above is finished, with respect to the substrate 71 (or 72) wherein predetermined display media 73 are filled in the cell 83, another substrate 72 (or 71) is attached by using an adhesive agent so as to obtain the information display panel.

Figure 17:
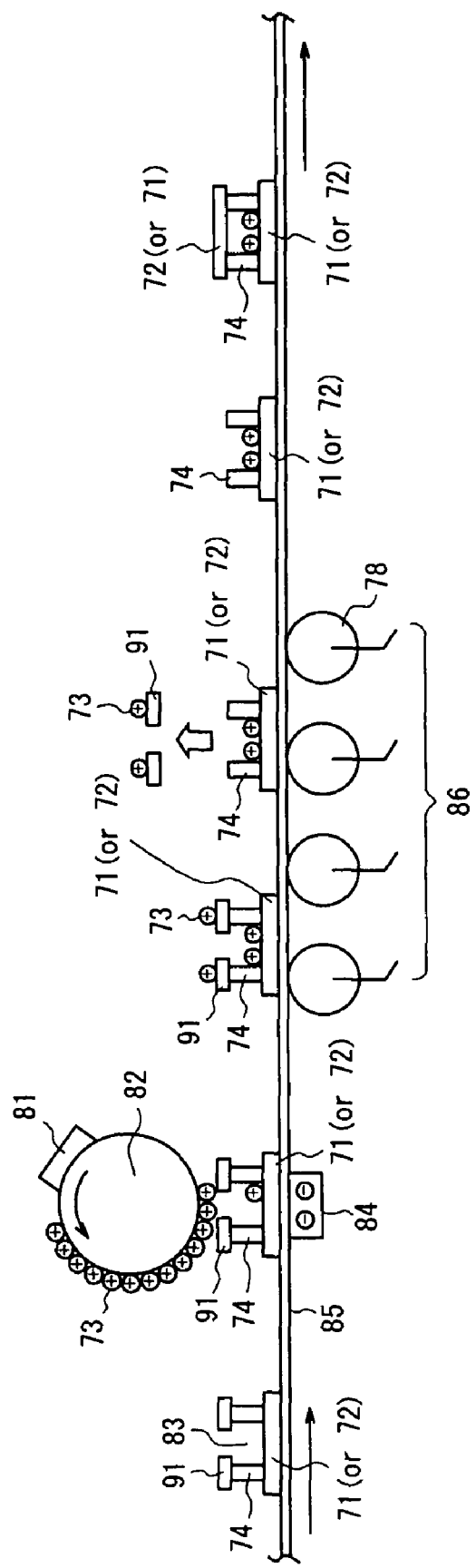
FIG. 17 is a schematic view explaining another embodiment of the method of manufacturing the information display panel according to the third preferred embodiment of the invention.

FIG. 17 is a schematic view explaining another embodiment of the method of manufacturing the information display panel according to the third preferred embodiment of the invention. In the embodiment shown in FIG. 17, the same members as those of FIG. 16 are denoted by the same reference numerals, and an explanation thereof is omitted here. In the embodiment shown in FIG. 17, the suction potential applying device 86 is constituted by a plurality of successive potential applying rollers 88 in the mask removing process. The other constructions are the same as those of FIG. 12.

Figure 18:
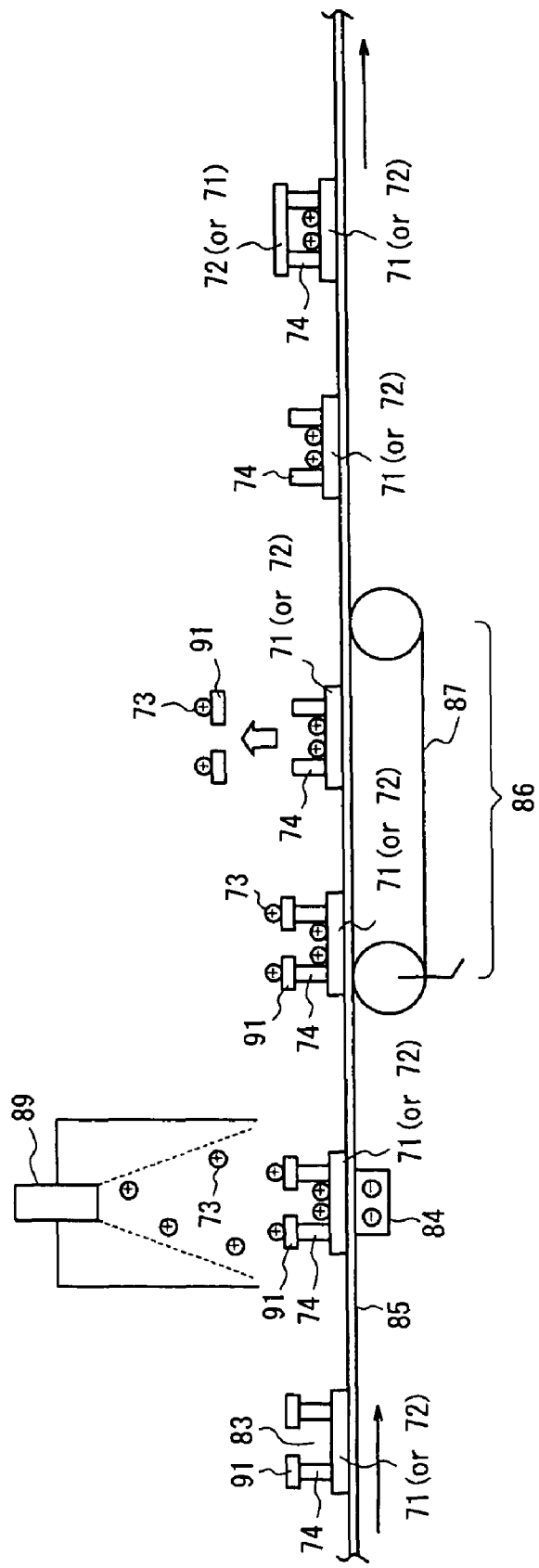
FIG. 18 is a schematic view explaining still another embodiment of the method of manufacturing the information display panel according to the third preferred embodiment of the invention.

FIG. 18 is a schematic view explaining still another embodiment of the method of manufacturing the information display panel according to the third preferred embodiment of the invention. In the embodiment shown in FIG. 18, the same members as those of FIG. 16 are denoted by the same reference numerals, and an explanation thereof are omitted here. In the embodiment shown in FIG. 18, the charged display media 73 are dispersed by using a display media charging and supplying device 89 to fill the display media 73 in the cell 83 in the display media filling process. The other constructions are the same as those of FIG. 16.

In the embodiment mentioned above, the explanation is made by using the positively charged display media 73 as the display media, but the negatively charged display media 73 can be used in the same manner in the method of manufacturing the information display panel according to the invention.

In the method of manufacturing the information display panel according to the third preferred embodiment of the invention mentioned above, in the case of filling the display media 73 in the cell 83 by using the photo-conductor roller 82 and the transferring device 84, or, in the case of filling the display media 73 in the cell 83 by using the display media charging and supplying device 89, the mask is used in the display media filling process. Therefore, the display media 73 remained on the partition walls 74 can be eliminated, and thus the display media 73 can be filled in the cell 83 preferably. Moreover, in the mask removing process, a potential having an inverse polarity as that of the display media 73 filled previously is applied continuously from a rear side of the substrate by using the suction potential applying device 86. Therefore, the display media filled in the cell 83 are not accompanied with the mask 91 to be removed, and thus a constant amount of the display media 73 can be filled in the cell 83.

Explanation of Fourth Preferred Embodiment

Figure 19:
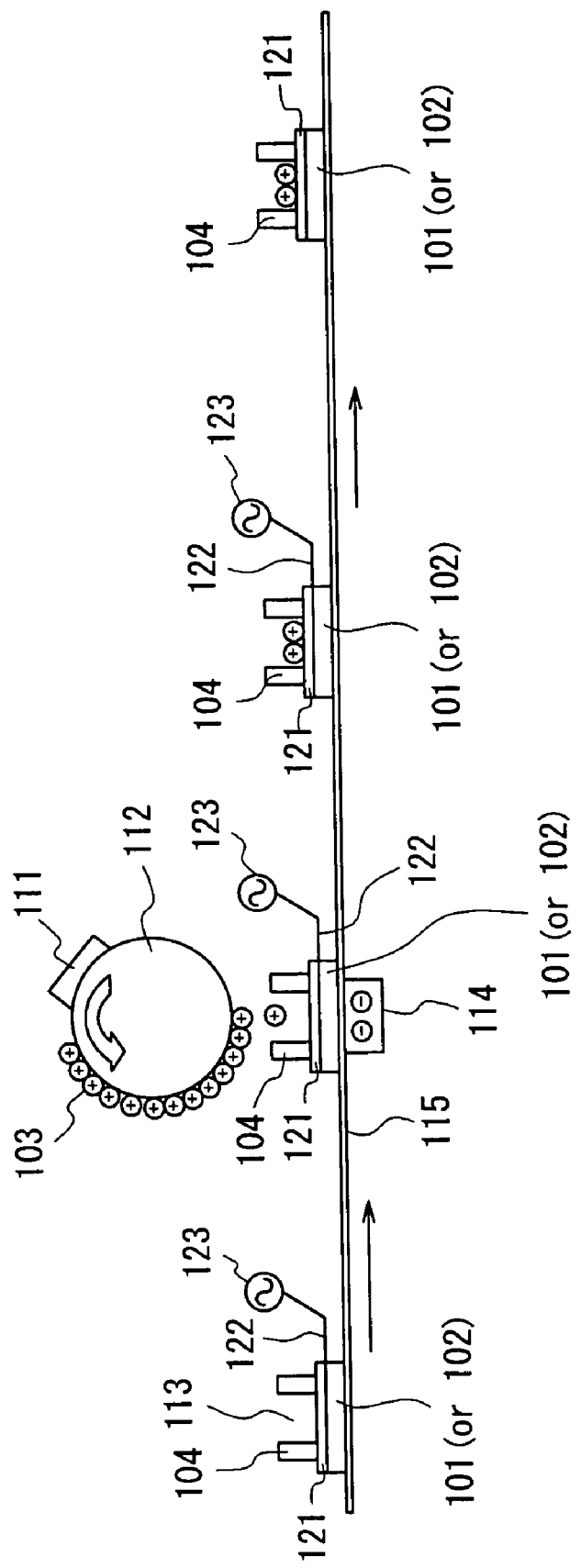
FIG. 19 is a schematic view explaining one embodiment of the method of manufacturing the information display panel according to the fourth preferred embodiment of the invention.

FIG. 19 is a schematic view explaining a first embodiment of the method of manufacturing the information display panel according to the fourth preferred embodiment of the invention. In the embodiment shown in FIG. 19, firstly, a support lead 122 is provided to for example an ITO electrode 121 (electrode 5 or 6 in FIGS. 2a and 2b-FIGS. 3a and 3b) formed on a substrate 101 (or 102) to which display media 103 are filled, and an alternating voltage is applied to the support lead 122 from an alternating voltage applying device 123. Under such a condition, the display media filling process mentioned below is performed.

In the display media filling process, firstly, the positively charged display media 103 for example are supported on the charge medium such as a photo-conductor, here, a photo-conductor roller 112 by using a charging device 111. With respect to the substrate 101 (or 102) having the cell 113, to which the display media 103 are to be filled, formed by the partition walls 104, a transferring device 114 is arranged at an inverse side of a side at which the cell 113 is arranged. By using the transferring device 114, an inverse polarity as that of the display media 103, here, a negative potential can be applied. Then, by rotating the photo-conductor roller 112, the positively charged display media 103 are introduce and filled into the cell 113 through the mask 121 due to a negative potential applied from the transferring device 114. In this embodiment, the substrate 101 wherein the display media 103 are filled in the cell 113 can be transported by a transporting belt 115.

Figure 20:
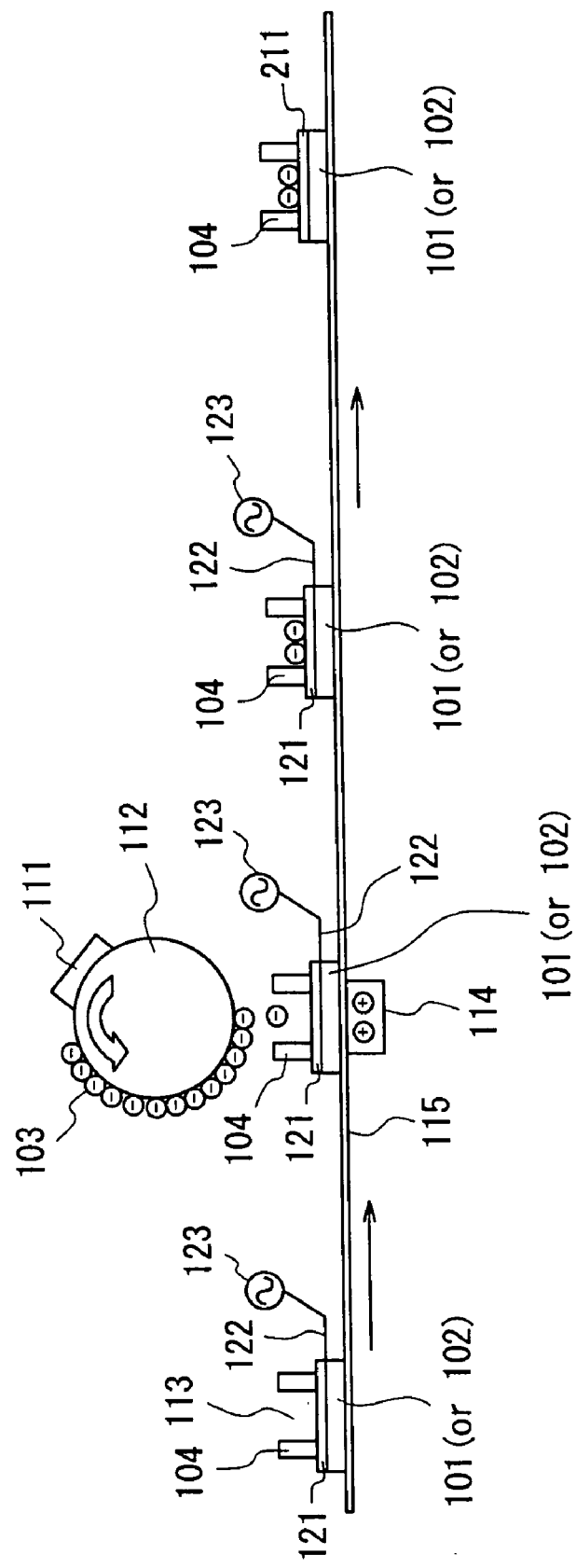
FIG. 20 is a schematic view explaining another embodiment of the method of manufacturing the information display panel according to the fourth preferred embodiment of the invention.

FIG. 20 is a schematic view explaining another first embodiment of the method of manufacturing the information display panel according to the fourth preferred embodiment of the invention. In the embodiment shown in FIG. 20, the same members as those of FIG. 19 are denoted by the same reference numerals, and an explanation thereof is omitted here. In the embodiment shown in FIG. 20, an example such that the negatively charged display media 103 are filled, and thus a positive potential is applied from the transferring device 114. Even in this case, the present invention can be achieved by applying an alternating voltage to an ITO electrode 121 from an alternating voltage applying device 123.

In the method of manufacturing the information display panel according to the first embodiment of the fourth preferred embodiment of the invention mentioned above, an alternating voltage is applied to the ITO electrode 121 arranged between the transferring device 114 as a potential applying means of an inverse polarity provided at a rear side of the substrate and the charged display media 103 in the cell 113. Therefore, the charged display media 103 provided on the photo-conductor roller 112 are moved easily to a substrate side, and thus the display media 103 can be filled in the cell 113 precisely. The reason for moving the conductive material such as electrodes on the substrate is not clearly understood, but it is thought that a mechanism like jumping phenomena of toner particles (charged particles) as can be seen in a developing of an electro photography is functioned.

Figure 21:
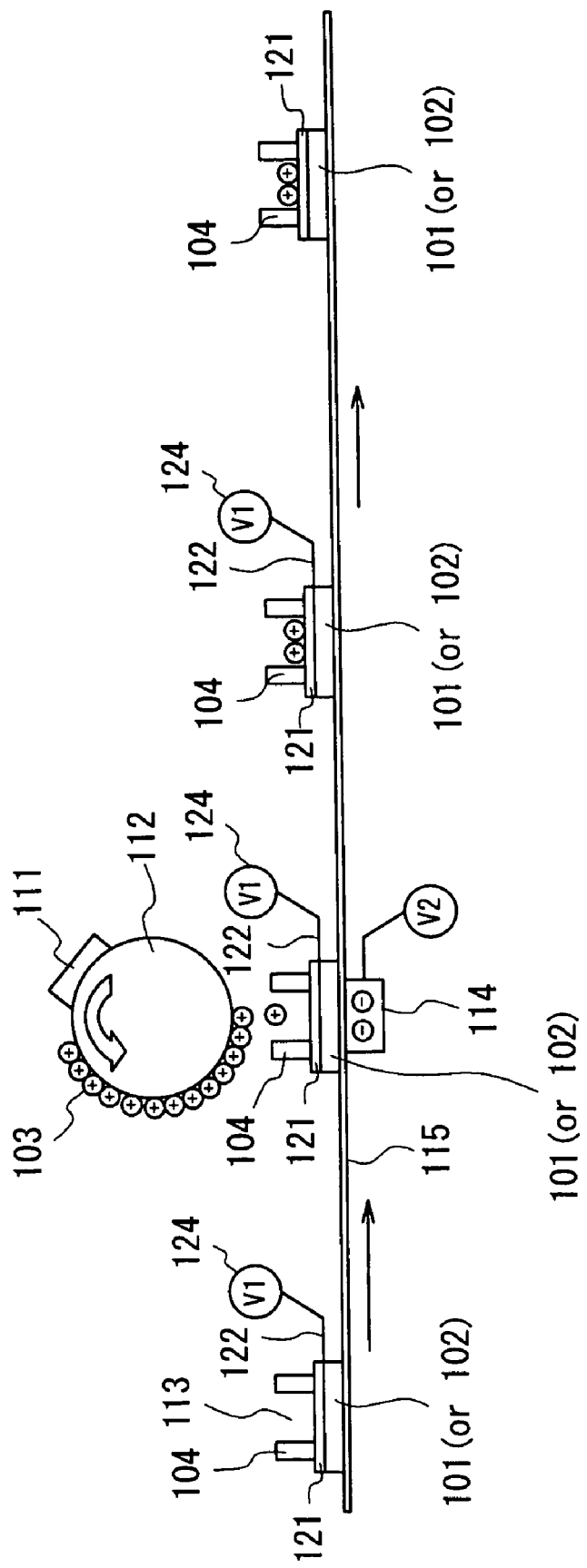
FIG. 21 is a schematic view explaining still another embodiment of the method of manufacturing the information display panel according to the fourth preferred embodiment of the invention.
Figure 22:
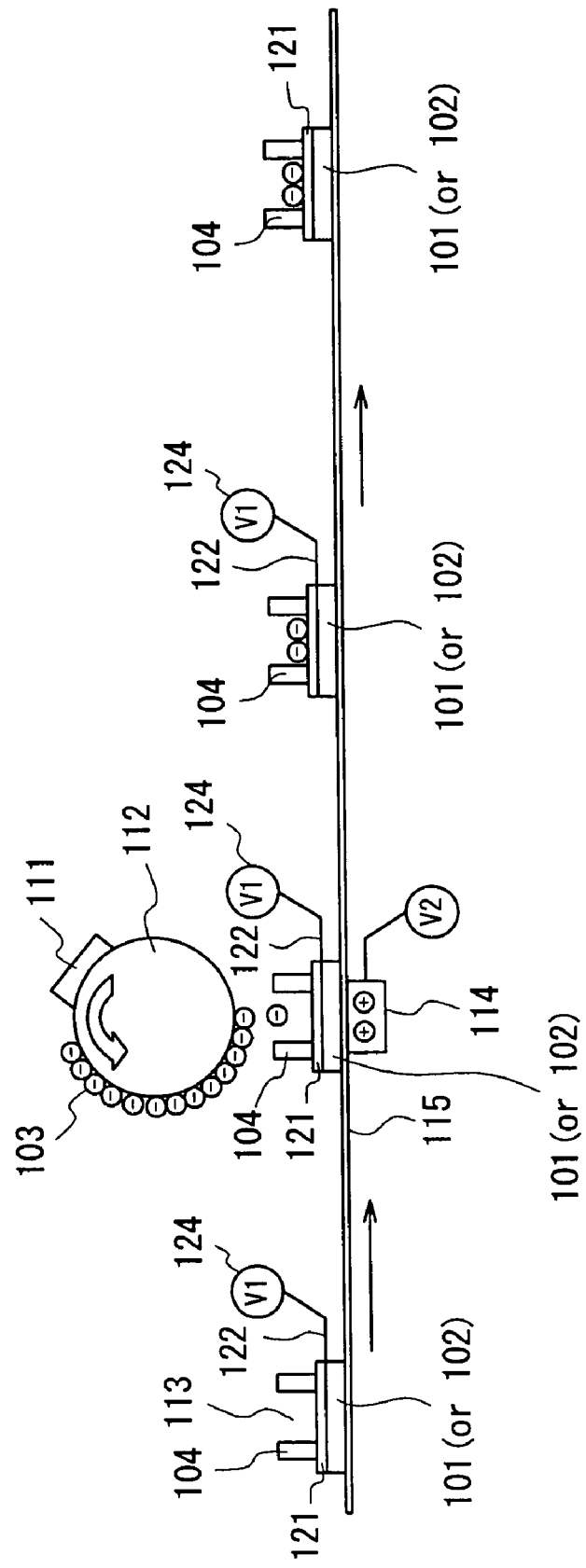
FIG. 22 is a schematic view explaining still another embodiment of the method of manufacturing the information display panel according to the fourth preferred embodiment of the invention.

FIG. 21 and FIG. 22 are schematic views respectively explaining still another embodiment of the method of manufacturing the information display panel according to a second embodiment of the fourth preferred embodiment of the invention. FIG. 21 shows the embodiment in which the positively charged display media 103 are filled as shown in FIG. 19, and FIG. 22 illustrates the embodiment in which the negatively charged display media 103 are filled as shown in FIG. 20. In the second embodiments of the fourth preferred embodiment of the invention shown in FIG. 21 and FIG. 22, when a potential applied from a potential applying device 124 to the ITO electrode 121 is assumed to be a V1 and a potential applied at a rear side of the substrate 101 (102) is assumed to be a V2, a relation between V1 and V2 is controlled to be $|V1|<|V2|$.

According to the method of manufacturing the information display panel according to the second embodiment of the fourth preferred embodiment of the invention, since an alternating voltage is applied from an alternating voltage applying device 123 to the ITO electrode 121, and, since, when a potential applied from a potential applying device 124 to the ITO electrode 121 is assumed to be a V1 and a potential applied at a rear side of the substrate 101 (or 102) is assumed to be a V2, a relation between V1 and V2 is controlled to be $|V1|<|V2|$, the display media 103 provided on the photo-conductor roller 112 are moved easily to the substrate side, and thus the display media 103 can be filled in the cell 113 precisely.

Figure 23:
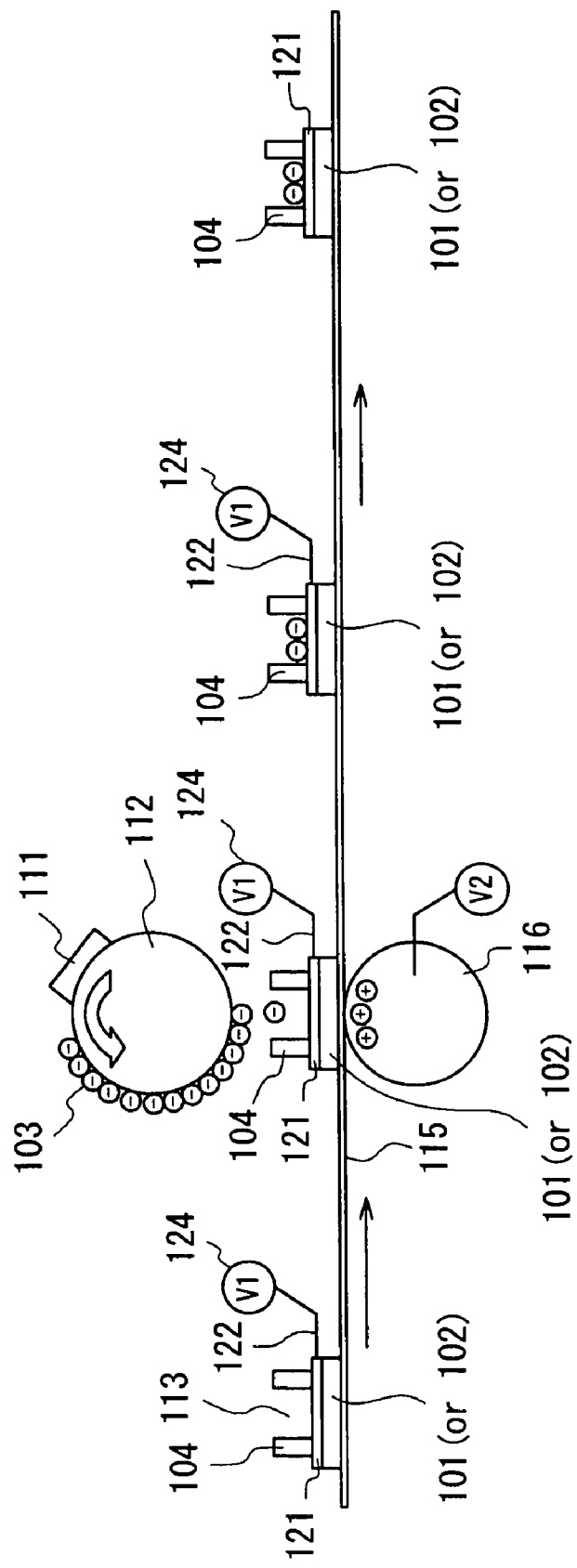
FIG. 23 is a schematic view explaining still another embodiment of the method of manufacturing the information display panel according to the fourth preferred embodiment of the invention.
Figure 24:
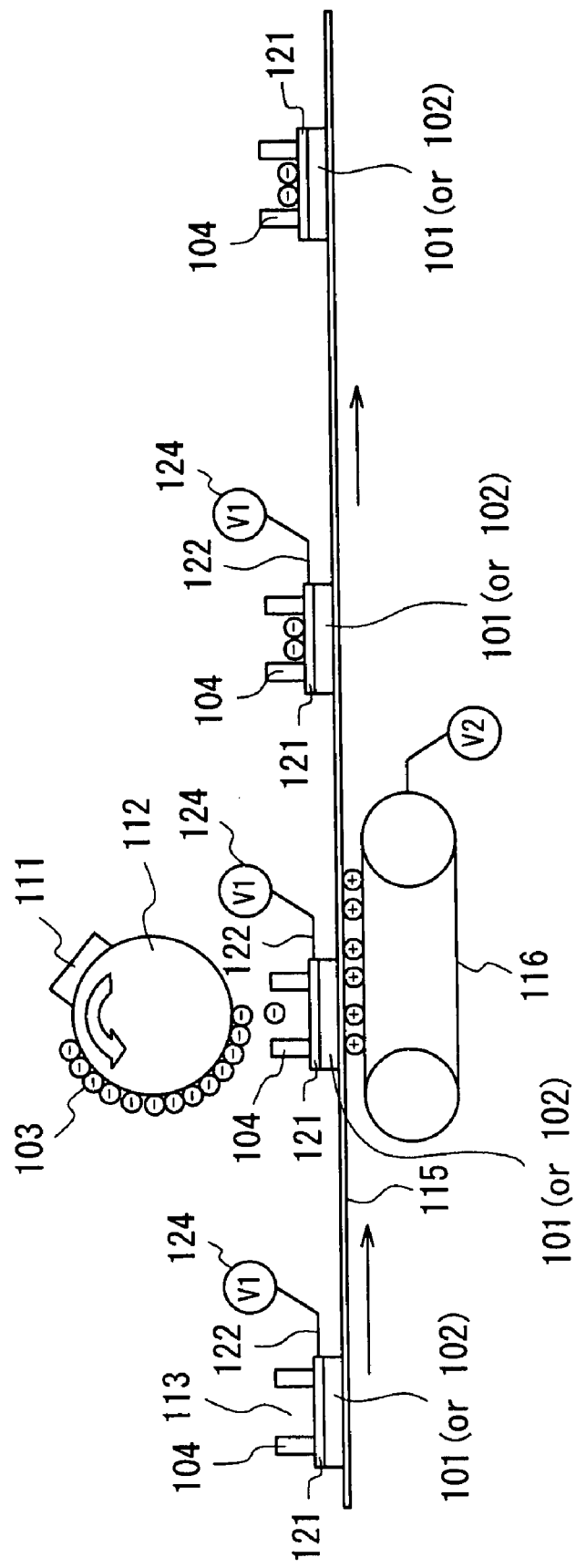
FIG. 24 is a schematic view explaining still another embodiment of the method of manufacturing the information display panel according to the fourth preferred embodiment of the invention.
Figure 25:
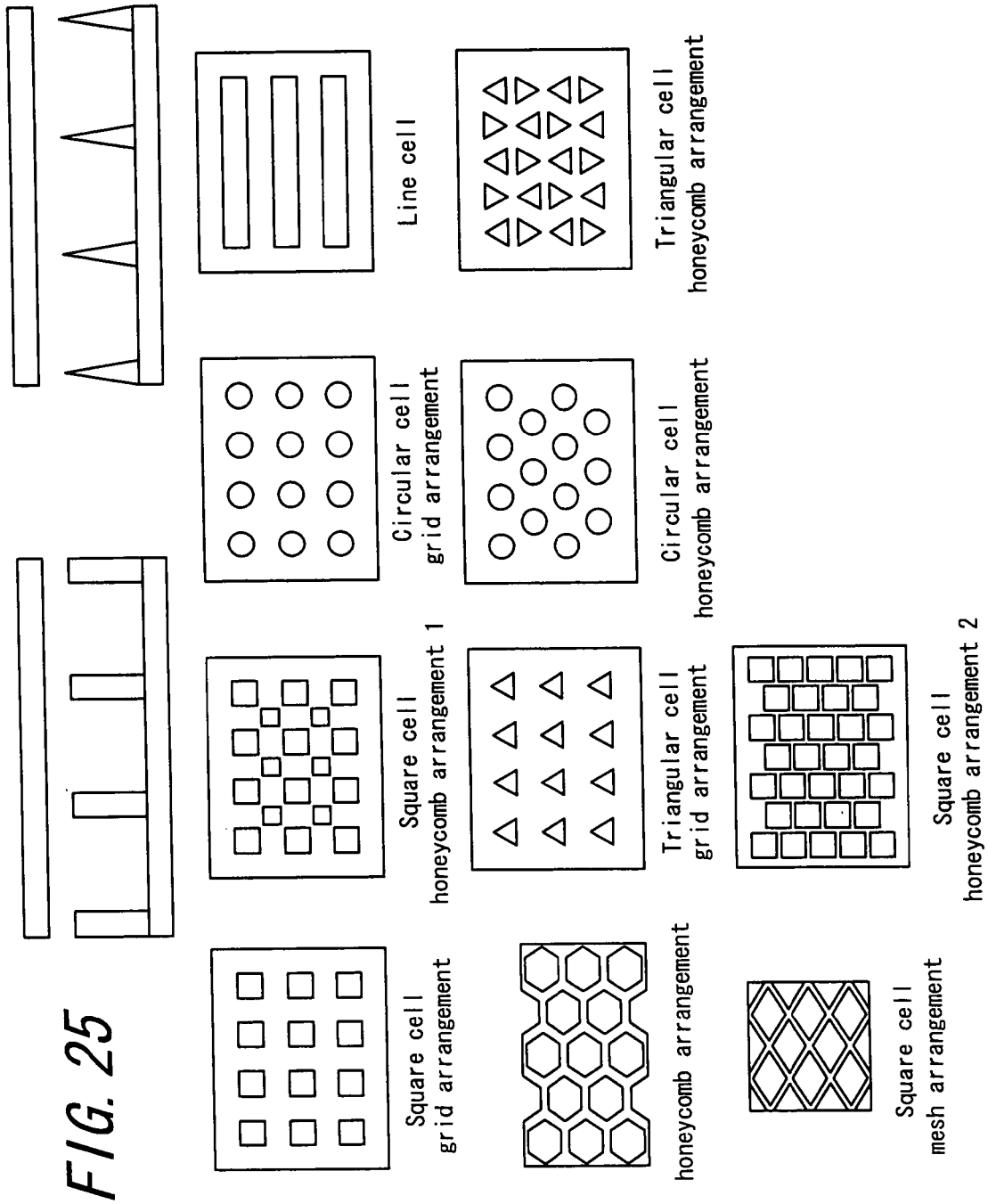
FIG. 25 is a schematic view showing one embodiment of partition wall shapes in the information display panel, which is an object of the manufacturing method according to the invention.

FIG. 23 and FIG. 24 are schematic views respectively explaining still another embodiment of the method of manufacturing the information display panel according to the second embodiment of the fourth preferred embodiment of the invention. FIG. 23 shows the embodiment in which the positively charged display media 103 are filled as shown in FIG. 21, and FIG. 24 illustrates the embodiment in which the negatively charged display media 103 are filled as shown in FIG. 22. In the embodiment shown in FIG. 23, a different point as that of FIG. 21 is that the transferring roller 116 is used as the transferring device 114. Moreover, in the embodiment illustrate in FIG. 24, a different point as that of FIG. 22 is that the transferring belt 117 is used as the transferring device 113. In both cases, the method of manufacturing the information display panel according to the invention can be preferably performed.

Hereinafter, respective members constituting the information display panel which is a target of the invention will be explained.

As the substrate, at least one of the substrates is the transparent substrate through which a color of the display media can be observed from outside of the panel, and it is preferred to use a material having a high transmission factor of visible light and an excellent heat resistance. The other substrate may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

As a material of the electrode in case of arranging the electrode in the information display panel, use is made of metals such as aluminum, silver, nickel, copper, gold, or, conductive metal oxides such as indium tin oxide (ITO), indium oxide, conductive tin oxide, antimony tin oxide (ATO), conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed to perform pattering. A transparency is necessary for the electrode arranged to the substrate at an observation side, but it is not necessary for the electrode arranged to the substrate at a rear side. In both cases, the materials mentioned above, which are transparent and have a pattern formation capability, can be suitably used. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary. In this case, the applied outer voltage may be superimposed with a direct current or an alternate current.

As the partition wall 4 arranged to the substrate, a shape of the partition wall is suitably designed in accordance with a kind of the display media used for the display and is not restricted. However, it is preferred to set a width of the partition wall to 2-100 μm more preferably 3-50 μm and to set a height of the partition wall to 10-500 μm more preferably 10-200 μm. The cell formed by the partition walls each made of rib has a square shape, a triangular shape, a line shape, a circular shape and a hexagon shape, and has an arrangement such as a grid, a honeycomb and a mesh, as shown in FIG. 4 viewed from a plane surface of the substrate. It is preferred that the portion corresponding to a cross section of the partition wall observed from the display side (an area of the frame portion of the cell) should be made as small as possible. In this case, a clearness of the image display can be improved.

As the mask used for the display media filling process in the fourth preferred embodiment, it is preferred that an opening shape of the mask corresponds to a cell shape formed on the substrate and a dimension of the opening is slightly smaller than the cell. If a dimension of the opening is larger than the cell, there is a drawback such that the display media are attached on the exposed partition walls in the case of providing the mask on the partition walls. One example of the mask is shown in FIG. 26.

Then, liquid powders used for example as display media in the information display panel according to the invention will be explained. It should be noted that a right of the name of liquid powders used in the information display panel according to the invention is granted to the applicant as "electric liquid powders" (Registered): register No. 4636931.

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display device according to the invention, a solid material is used as a dispersant.

The information display panel has a construction such that the liquid powders composed of a solid material stably floating as a dispersoid in a gas and exhibiting a high fluidity in an aerosol state are sealed between opposed two substrates, wherein one of two substrates is transparent. Such liquid powders show an excellent fluidity state such that there is no repose angle defining a fluidity of powder, and can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the information display device according to the invention, the liquid powders used in a state such that a solid material is relatively and stably floating as a dispersoid in a gas.

Then, the particles for the display media (hereinafter, called sometimes as particles) constituting the display media used in the information display panel according to the invention will be explained. The particles for the display media may be used as the display media constituted by the particles only, or, as the display media constituted by mixing various groups of the particles, or, as the display media constituted by the liquid powders obtained by controlling and mixing the particles. The particle may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hansayellow G, hansayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

By mixing the coloring agents mentioned above, it is possible to produce a particle for display media having a suitable color.

Moreover, as the particle diameter of the particles for display media, it is preferred to set an average particle diameter to 1-20 μm and to use even particles. If the average particle diameter exceeds this range, the image clearness sometimes deteriorated, and, if the particle diameter is smaller than this range, an agglutination force between the particles becomes too large and the movement of the particles is prevented.

Further, it is preferred that particle diameter distribution Span of the particles for display media, which is defined by the following formula, is less than 5 preferably less than 3:

Span=$(d(0.9)-d(0.1))/d(0.5)$;

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

If the particle diameter distribution Span is set to not more than 5, the particle diameter becomes even and it is possible to perform an even particle movement.

Furthermore, as a correlation between the particles for display media, it is preferred to set a ratio of d(0.5) of the particles having smallest diameter with respect to d(0.5) of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

After various investigations of the inventors, it is fond that an adequate range of the charged values of the particles for the display media can be estimated by performing a blow-off method utilizing the same carrier particles so as to measure the charge amount of the particles for the display media.

Further, in the dry-type information display panel in which the display media constituted by the particles for display media are driven in an air space, it is important to control a gas in a gap surrounding the display media between the substrates, and a suitable gas control contributes an improvement of display stability. Specifically, it is important to control a humidity of the gap gas to not more than 60% RH at 25° C., preferably not more than 50% RH.

The above gap means a gas portion surrounding the display media obtained by substituting the electrodes 5, 6 (in the case of arranging electrode inside of substrate), an occupied portion of the display media 3 (particles or liquid powders), an occupied portion of the partition walls 4 and a seal portion of the device from the space between the substrate 1 and the substrate 2 for example in FIGS. 1*a* and 1*b*-FIGS. 3*a* and 3*b*.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10-500 µm, preferably 10-200 µm.

Moreover, it is preferred to control a volume occupied rate of the display media in a space between the opposed substrates to 5-70%, more preferably 5-60%. If the volume occupied rate of the display media exceeds 70%, the display media become difficult to move, and if it is less than 5%, a sufficient contrast cannot be obtained and a clear image display is not performed.

EXAMPLES

Hereinafter, the present invention will be explained further specifically with reference to the examples according to the invention and the comparative examples, but the present invention is not limited to the following examples. In this embodiment, the information display panels according to the example and the comparative example were manufactured according to the following method and estimated on the basis of the following standard.

"Preparation of Display Media"

In the embodiment and the comparative embodiment, two groups of display media having white and black colors and different charge characteristics (particles A and particles B) were used as the display media.

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronE89 (Orient Chemical Industries Ltd.) 2 parts by weight were added, mixed and ground by a jet-mill. Further, the thus ground particles were formed to substantially circular particles by applying a mechanically impact force by means of hybridizer apparatus (Nara Machinery Co., Ltd.) and the thus formed particles were classified so as to produce the particles A. The particles A were black particles having an average particle diameter of 9.1 µm, a substantially circular shape and a negative charge characteristic.

The particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the substantially circular particles were obtained by classifying the dried member by means of classifier (MDS-2: NIPPON PNEUMATIC MFG. CO., LTD.). The thus produced particles B were circular white particles having an average particle diameter of 8.5 µm and a positive charge characteristic, and were used as the particles B.

"Manufacture of Panel Substrate"

A glass transparent substrate (7 cm×7 cm square) with ITO electrodes was prepared, and a rib having a height of 50 µm was formed on the substrate so as to form partition walls having a square shape and a grid-like arrangement.

The rib formation was performed as follows. A dry-film photoresist NIT 250 produced by Nichigo-Morton Co., Ltd., which is a photosensitive film, was laminated on a glass with ITO, and then exposure and development operations were performed thereto so as to form the desired partition walls having a line of 30 µm, a space of 320 µm and a pitch of 350 µm. As the other substrate, a glass transparent substrate (7 cm×7 cm square) with ITO electrodes was prepared.

Examples According to Main Embodiment

Example 1

Two groups of particles having different light reflectance and different charge characteristics (particles A, particles B) were successively filled in the cell of one substrate formed by the partition walls according to the display media filling process shown in FIG. 5. Filling amounts of the particles A and the particles B were controlled to be same volumes, and a volume occupying rate of both particles were controlled to be 25 vol % with respect to a space generated between the laminated two substrates. Then, another substrate was laminated to the substrate wherein the particles were filled in the cell, and the display media (particles A and particles B) were sealed between two substrates in such a manner that a periphery of the substrate was connected and sealed by using epoxy adhesives so as to manufacture the information display panel.

Example 2

Two groups of particles having different light reflectance and different charge characteristics (particles A, particles B) were separately filled in the cell of one substrate formed by the partition walls and in the cell of another substrate on which the partition walls were not formed according to the display media filling process shown in FIG. 6. Filling amounts of the particles A and the particles B were controlled to be same volumes, and a volume occupying rate of both particles were controlled to be 25 vol % with respect to a space generated between the laminated two substrates. Then, another substrate was laminated to the substrate wherein the particles were filled in the cell, and the display media (particles A and particles B) were sealed between two substrates in such a manner that a periphery of the substrate was connected and sealed by using epoxy adhesives so as to manufacture the information display panel.

Comparative Example 1

The information display panel was manufactured as is the same as the example 1 except that a predetermined amount of the display media (particles A and particles B) were filled in the cell in such a manner that the particles A and the particles B were dispersed orderly in the cell of the substrate, on which the partition walls were formed, by means of the particles charging and dispersing device. That is, the display media were filled without using the display media filling process according to the invention so as to manufacture the information display panel.

With respect to the examples 1, 2 and the comparative example 1, a state after filling the display media and a state after laminating the substrates were investigated. The results are shown in the following Table 1.

TABLE 1

|  | Example 1 | Example 2 | Comparative example 1 |
|---|---|---|---|
| Display media filling process | Display media charging and supporting process/ display media aligning process/ display media transferring process | Display media charging and supporting process/ display media aligning process/ display media transferring process | Particles charging and dispersing process |
| State after filling display media | No display media on partition walls | No display media on partition walls | Display media on partition walls |
| State after laminating substrates | Predetermined panel thickness | Predetermined panel thickness | Thicker than predetermined panel thickness, and variation of panel thickness |

From the results shown in Table 1, the followings were understood. In the image display panels according to the examples 1, 2, in which the display media were filled according to the display media filling process comprising the display media charging and supporting process, the display media aligning process and the display media transferring process, the display media did not remain on the partition walls during the display media filling process, and there was no problem if two substrates were laminated as they were. On the other hand, in the comparative example 1, in which the display media were filled by using the particles charging and dispersing device without using the filling process according to the invention, the display media remain on the partition walls during the display media filling process, and there was a problem if two substrates were laminated as they were.

Examples According to First Preferred Embodiment

Example 11

Two groups of display media having white and black colors respectively and different charge characteristics (particles A, particles B) were successively filled in the cell of one substrate formed by the partition walls according to the display media filling process shown in FIG. 11. Firstly, the black color display media (black color particles) were filled, and the white color display media (white color particles) were filled thereon after removing an electricity by means of an ion generating device (product of KEYENCE CORPORATION: SJ-F010) of air-ion type. The results of observing and estimating a state after finishing the filling process were shown in the following Table 2.

Example 12

The display media were filled as is the same as the example 11 except that an order of filling two groups of display media having white and black colors respectively and different charge characteristics (particles A, particles B) was reversed. The results of observing and estimating a state after finishing the filling process were shown in the following Table 2.

Example 13

The display media were filled as is the same as the example 11 except that an ion generating device (product of KEYENCE CORPORATION: SJ-R036) of corona discharge type. The results of observing and estimating a state after finishing the filling process were shown in the following Table 2.

Comparative Example 11

The display media were filled as is the same as the example 11 except that the electricity removing process was not arranged. The results of observing and estimating a state after finishing the filling process were shown in the following Table 2.

TABLE 2

|  | Example 11 | Example 12 | Example 13 | Comparative example 11 |
|---|---|---|---|---|
| Electricity removing process | Perform Air-ion type | Perform Air-ion type | Perform Corona discharge type | Not perform |
| Panel state after finishing filling process | No display media remain on partition walls, predetermined amount of display media filling | No display media remain on partition walls, predetermined amount of display media filling | No display media remain on partition walls, predetermined amount of display media filling | When filling second display media, first display media remain on partition walls by jumping out of cell, and not-predetermined amount of display media filing |

From the results of Table 2, it was understood that a predetermined amount of the display media could be filled in the examples 11-13 according to the invention, but, in the comparative example 11, the first display media (here, the black color display media) were jumped out of the cell when the second display media (here, the white color display media) were filled ant thus a predetermined amount of the display media was not filled.

Examples According to Second Preferred Embodiment

Example 21

Two groups of particles having white and black colors and different charge characteristics (particles A, particles B) were respectively filled (arranged) in the cell of one substrate formed by the partition walls and in the cell of another substrate on which the partition walls were not formed according to the display media filling process shown in FIG. 13 and the display media filling process shown in FIG. 14. After that, the substrate on which the white color display media (white color particles) were filled was laminated to the substrate on which the black color display media (black color particles) were filled so as to manufacture the information display panel. The results for observing and estimating a state until transporting to the panel laminating process after finishing the filling process with respect to the two groups of the panel substrates were shown in the following Table 3.

Example 22

Two groups of particles having white and black colors and different charge characteristics (particles A, particles B) were respectively filled (arranged) in the cell of one substrate formed by the partition walls and in the cell of another substrate on which the partition walls were not formed according to the display media filling process shown in FIG. 15 (two processes preparing respectively to the charge characteristics of the display media). After that, the substrate on which the white color display media (white color particles) were filled was laminated to the substrate on which the black color display media (black color particles) were filled so as to manufacture the information display panel. The results for observing and estimating a state until transporting to the panel laminating process and after finishing the filling process with respect to the two groups of the panel substrates were shown in the following Table 3.

Comparative Example 21

In the panel transporting process after filling, the processes until the panel substrate transporting process were performed as is the same as the example 21 except that the panel substrate was transported under a condition such that a voltage is not applied to the successive plurality of rollers, and a state after transporting to the substrate laminating process was observed and estimated. The results were shown in the following Table 3.

TABLE 3

|  | Example 21 | Example 22 | Comparative example 21 |
|---|---|---|---|
| Voltage application during panel substrate transporting process | Perform Successive plurality of voltage applying rollers | Perform Voltage applying belt | Not perform |
| Panel substrate state before laminating substrates and after finishing panel substrate transporting process | No display media on partition walls, and no scattering loss of filled display media | No display media on partition walls, and no scattering loss of filled display media | Display media on partition walls, and scattering loss of filled display media |

From the results shown in Table 3, the followings were understood. In the example 21 and the example 22, a voltage having an inverse polarity as that of the display media filled previously was applied from a rear side of the panel substrate in the panel substrate transporting process until the substrate transporting process after filling the display media. Therefore, the display media filled in the cell were not jumped out of the cell during the transporting, and then don't adhere on the partition walls, so that the panel substrates could be laminated as they were. On the other hand, in the comparative example 21, a voltage having an inverse polarity as that of the display media filled previously was not applied from a rear side of the panel substrate in the panel substrate transporting process until the substrate transporting process after filling the display media. Therefore, the display media filled in the cell were jumped out of the cell during the transporting, and then adhere on the partition walls, so that the panel substrates could not be laminated as they were.

Examples According to Third Preferred Embodiment

In the third preferred embodiment, the white color display media constituted by the particles B mentioned above were used, and a charge amount thereof was +10 μm/C (positively charged). Moreover, when the panel substrate was manufactured, the partition walls having a hexagonal shape and a honeycomb arrangement were formed other than the partition walls having the square shape and the grid-like arrangement.

Example 31

According to the display media filing process shown in FIG. 16, the white color display media were filled in the cell under such a condition that the mask having a shape corresponding to the partition wall shape (mask having an opening slightly smaller than the cell opening) was arranged to the substrate on which the partition walls having the square shape and the grid-like arrangement were formed. Filling amount was controlled in such a manner that a volume occupying rate was to be 25 vol % with respect to a space generated between the laminated two substrates.

Then, according to the mask removing process shown in FIG. 16, the mask, on which the display media were arranged, was removed from the substrate under such a condition that a potential was applied to the suction potential applying device arranged at a rear side of the substrate, and the display media filling was finished.

Example 32

According to the display media filing process shown in FIG. 16, the white color display media were filled in the cell under such a condition that the mask having a shape corresponding to the partition wall shape (mask having an opening slightly smaller than the cell opening) was arranged to the substrate on which the partition walls having the hexagonal shape and the honeycomb arrangement were formed. Filling amount was controlled in such a manner that a volume occupying rate was to be 25 vol % with respect to a space generated between the laminated two substrates.

Then, according to the mask removing process shown in FIG. 16, the mask, on which the display media were arranged, was removed from the substrate under such a condition that a potential was applied to the suction potential applying device arranged at a rear side of the substrate, and the display media filling was finished.

Comparative Example 31

According to the display media filing process shown in FIG. 16, the white color display media were filled in the cell under such a condition that the mask having a shape corresponding to the partition wall shape (mask having an opening slightly smaller than the cell opening) was arranged to the substrate on which the partition walls having the square shape and the grid-like arrangement were formed. Filling amount was controlled in such a manner that a volume occupying rate was to be 25 vol % with respect to a space generated between the laminated two substrates.

Then, in the mask removing process shown in FIG. 16, the mask, on which the display media were arranged, was removed from the substrate under such a condition that a potential was not applied to the suction potential applying device arranged at a rear side of the substrate (that is, the mask removing process according to the invention was not used), and the display media filling was finished.

Comparative Example 32

According to the display media filing process shown in FIG. 16, the white color display media were filled in the cell under such a condition that the mask having a shape corresponding to the partition wall shape (mask having an opening slightly smaller than the cell opening) was arranged to the substrate on which the partition walls having the hexagonal shape and the honeycomb arrangement were formed. Filling amount was controlled in such a manner that a volume occupying rate was to be 25 vol % with respect to a space generated between the laminated two substrates.

Then, in the mask removing process shown in FIG. 16, the mask, on which the display media were arranged, was removed from the substrate under such a condition that a potential was not applied to the suction potential applying device arranged at a rear side of the substrate (that is, the mask removing process according to the invention was not used), and the display media filling was finished.

The results mentioned above were shown in Table 4.

TABLE 4

| | Example 31 | Example 32 | Comparative example 31 | Comparative example 32 |
|---|---|---|---|---|
| Existence or nonexistence of applying by suction potential applying device | Existence | Existence | Nonexistence | Nonexistence |
| Mask shape | Square shape | Hexagonal shape | Square shape | Hexagonal shape |
| Observing result when removing mask | No filled display media accompanied with mask | No filled display media accompanied with mask | Filled display media accompanied with mask and adhered on partition walls | Filled display media accompanied with mask and adhered on partition walls |

From the results shown in Table 4, the followings were understood. In the example 31 and the example 32, wherein the mask was removed under such a condition that a potential was applied from the suction potential applying device arranged at a rear side of the substrate in the mask removing process after filling the display media, the filled display media were not accompanied with the mask and thus a predetermined amount of display media could be filled. On the other hand, in the comparative example 31 and the comparative example 32, wherein the mask was removed under such a condition that a potential was not applied from the suction potential applying device arranged at a rear side of the substrate in the mask removing process after filling the display media, the filled display media were accompanied with the mask or the display media accompanied with the mask were mounted on the partition walls, and thus a predetermined amount of display media could not be filled.

Examples According to Fourth Preferred Embodiment

In the fourth preferred embodiment, when the panel substrate mentioned above was manufactured, a lead was arranged to the ITO electrode, and the same potential was applied to all the ITO electrodes on the substrate from the external power source.

Example 41

Two groups of display media having different colors and different charge characteristics (particles A and particles B) were successively filled in the cell of one substrate on which the partition walls were formed while applying an alternating voltage of 100 V to the ITO substrate by successively performing the display media filling processes shown in FIG. 19 and FIG. 20.

Example 42

Two groups of display media having different colors and different charge characteristics (particles A and particles B) were filled (arranged) in the cell of one substrate on which the partition walls were formed by successively performing the display media filling processes shown in FIG. 21 and FIG. 22. In the process shown in FIG. 21, it was assumed to be V1=−150 V and V2=−200 V, and in the process shown in FIG. 22, it was assumed to be V1=+150 V and V2=+200 V.

Comparative Example 41

The display media were filled as is the same as the example 41 except that the alternating voltage was not applied. That is, the display media were filled without using the display media filling process according to the invention.

Comparative Example 42

Two groups of display media having different colors and different charge characteristics (particles A and particles B) were filled (arranged) in the cell of one substrate on which the partition walls were formed by successively performing the display media filling processes shown in FIG. 21 and FIG. 22. In the process shown in FIG. 21, it was assumed to be V1=−200 V and V2=−150 V, and in the process shown in FIG. 22, it was assumed to be V1=+200 V and V2=+150 V.

From the results shown in Table 5, the followings were understood. In the example 41 and the example 42, since the alternating voltage was applied to the ITO electrode, or, since a relation between the potential V1 applied to the ITO electrode and the potential V2 applied to a rear side of the substrate was to be |V1|<|V2|, the display media arranged on the photo-conductor roller were moved and were filled precisely in the cell on the substrate. On the other hand, in the comparative example 41 and the comparative example 42, since the alternating voltage was not applied to the ITO electrode, or, since a relation between the potential V1 applied to the ITO electrode and the potential V2 applied to a rear side of the substrate was not to be |V1|<|V2|, the display media arranged on the photo-conductor roller were not moved and were not filled precisely in the cell on the substrate.

INDUSTRIAL APPLICABILITY

The information display panel manufactured according to the manufacturing method of the invention is applicable to the display unit for mobile equipment such as notebook type personal computers, PDAs, cellular phones, handy terminal and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric advertisement, information board, electric POP (Point Of Presence, Point Of Purchase advertising), electric price tag, electric shelf tag, electric musical score, RF-ID device and so on.

The invention claimed is:

1. A method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, characterized in that a display media filling process for filling the display media in the cell comprises: a display media charging and supporting process for supporting charged display media; a display media aligning process for aligning the supported display media corresponding to an electrostatic latent image;

TABLE 5

|  | Example 41 | Example 42 | Comparative example 41 | Comparative example 42 |
|---|---|---|---|---|
| Potential applying (Volt) in display media filling process | Alternating voltage V = 100 | (positively charged particle filling process): V1 = −150, V2 = −200 (negatively charged particle filling process): V1 = +150, V2 = +200 | No potential applying | (positively charged particles filling process): V1 = −200, V2 = −150 (negatively charged particle filling process): V1 = +200, V2 = +150 |
| State for filling display media | No display media adhered on partition walls, and display media filled | No display media adhered on partition walls, and display media filled | No display media movement, and no display media filled | No display media movement, and no display media filled | and a display media transferring and filling process for transferring and filling the aligned display media in the cell, wherein the display media transferring and filling process comprises: a first display media filling process for filling the display media in the cell by arranging the display media charged at one polarity on the cell of the substrate, and applying a potential with the other polarity which is an inverse polarity as that of the display media from a rear side of the substrate; an electricity removing process for performing an electricity removing with respect to the display media filled in the cell; and a second display media filling process for filling the display media in the cell by arranging the display media charged at the other polarity on the cell in which the display media charged at one polarity are filled, and applying a potential with one polarity which is an inverse polarity as that of the display media from a rear side of the substrate.

2. The method of manufacturing an information display panel according to claim 1, wherein two groups of the display media having different charged polarity have different colors.

3. The method of manufacturing an information display panel according to claim 1, wherein a pattern based on the electrostatic latent image in the display media aligning process is a region, which corresponds to a cell opening portion formed by the partition walls on the substrate and is smaller than the cell opening portion.

4. The method of manufacturing an information display panel according to claim 1, wherein the display media charging and supporting process is performed by supplying the charged display media from a display media charging and supplying device to a display media supporting roller.

5. The method of manufacturing an information display panel according to claim 1, wherein the display media aligning process is performed by forming the electrostatic latent image having a predetermined pattern on a surface of a photosensitive drum by means of an electrostatic latent image forming device, and aligning the display media on the basis of the electrostatic latent image on the photosensitive drum.

6. The method of manufacturing an information display panel according to claim 1, wherein the display media transferring and filling process is performed by passing the substrate with the cell through a space between the aligned display media and a transferring device, and transferring and filling the display media in the cell.

7. The method of manufacturing an information display panel according to claim 1, wherein the display media filling process is arranged by the number of groups of the display media respectively with the two substrates and they are arranged in parallel.

8. A method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, characterized in that a display media filling process for filling the display media in the cell comprises: a display media charging and supporting process for supporting charged display media; a display media aligning process for aligning the supported display media corresponding to an electrostatic latent image; and a display media transferring and filling process for transferring and filling the aligned display media in the cell, wherein the display media transferring and filling process comprises: a display media filling process for filling the display media in the cell by arranging the display media charged at one polarity on the cell of the substrate, and applying a potential with the other polarity which is an inverse polarity as that of the display media from a rear side of the substrate; and a panel transporting process after filling for transporting the substrate whose cells are filled by the display media to a next process under a condition such that a potential with the other polarity which is an inverse polarity as that of the display media is applied to a rear side of the substrate.

9. The method of manufacturing an information display panel according to claim 8, wherein the panel transporting process after filling is performed by transporting the substrate in which the display media are filled by means of a transporting means; and applying a predetermined voltage from a voltage applying auxiliary means arranged at a reverse side of the substrate on the transporting means during the transporting operation.

10. The method of manufacturing an information display panel according to claim 9, wherein the voltage applying auxiliary means is a successive plural voltage applying rollers.

11. The method of manufacturing an information display panel according to claim 9, wherein the voltage applying auxiliary means is a voltage applying belt.

12. A method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, characterized in that a display media filling process for filling the display media in the cell comprises: a display media charging and supporting process for supporting charged display media; a display media aligning process for aligning the supported display media corresponding to an electrostatic latent image; and a display media transferring and filling process for transferring and filling the aligned display media in the cell, wherein the display media transferring and filling process comprises: a display media filling process for filling the display media charged at one polarity in the cell by providing a mask on the partition walls and applying a potential with the other polarity which is an inverse polarity as that of the display media from a rear side of the substrate; and a mask removing process for removing the mask from the partition walls under a condition such that a potential with the other polarity which is an inverse polarity as that of the display media filled in the cell from a rear side of the substrate.

13. The method of manufacturing an information display panel according to claim 12, wherein a pattern based on the electrostatic latent image in the display media aligning process is a region, which corresponds to a cell opening portion formed by the partition walls on the substrate and is smaller than the cell opening portion.

14. The method of manufacturing an information display panel according to claim 12, wherein the display media charging and supporting process is performed by supplying the charged display media from a display media charging and supplying device to a display media supporting roller.

15. The method of manufacturing an information display panel according to claim 12, wherein the display media aligning process is performed by forming the electrostatic latent image having a predetermined pattern on a surface of a photosensitive drum by means of an electrostatic latent image forming device, and aligning the display media on the basis of the electrostatic latent image on the photosensitive drum.

16. The method of manufacturing an information display panel according to claim 12, wherein the display media transferring and filling process is performed by passing the substrate with the cell through a space between the aligned display media and a transferring device, and transferring and filling the display media in the cell.

17. The method of manufacturing an information display panel according to claim 12, wherein the display media filling process is arranged by the number of groups of the display media respectively with the two substrates and they are arranged in parallel.

18. A method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, characterized in that a display media filling process for filling the display media in the cell comprises: a display media charging and supporting process for supporting charged display media; a display media aligning process for aligning the supported display media corresponding to an electrostatic latent image; and a display media transferring and filling process for transferring and filling the aligned display media in the cell, wherein the display media transferring and filling process comprises: a display media filling process for filling the display media charged at one polarity on the cell of the substrate, applying a potential with the other polarity which is an inverse polarity as that of the display media from a rear side of the substrate, and applying an alternating voltage to an electrode arranged on the substrate.

19. A method of manufacturing an information display panel, in which at least one group of display media having light reflectance and charge characteristics, constituted by at least one group of particles, are sealed in a cell formed by partition walls between opposed two substrates, at least one substrate being transparent, and, in which the display media, to which an electrostatic field is applied, are made to move so as to display information such as an image, characterized in that a display media filling process for filling the display media in the cell comprises: a display media charging and supporting process for supporting charged display media; a display media aligning process for aligning the supported display media corresponding to an electrostatic latent image; and a display media transferring and filling process for transferring and filling the aligned display media in the cell, wherein the display media transferring and filling process comprises: a display media filling process for filling the display media in the cell by arranging the display media charged at one polarity on the cell of the substrate, applying a potential with the other polarity which is an inverse polarity as that of the display media from a rear side of the substrate, applying a potential V1 to an electrode arranged on the substrate, applying a potential V2 to a rear side of the substrate, and controlling a relation between potentials to $|V1|<|V2|$.

* * * * *